(12) United States Patent
Agrawal

(10) Patent No.: US 6,286,335 B1
(45) Date of Patent: Sep. 11, 2001

(54) PROCESSES FOR MULTICOMPONENT SEPARATION

(75) Inventor: Rakesh Agrawal, Emmaus, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 09/389,965

(22) Filed: Sep. 3, 1999

(51) Int. Cl.$^7$ ............................................. F25J 1/00
(52) U.S. Cl. ............................................. 62/631; 62/623
(58) Field of Search .......................... 62/630, 631, 623

(56) References Cited

U.S. PATENT DOCUMENTS

| | | | |
|---|---|---|---|
| 3,620,030 | * 11/1971 | Iikubo et al. ........................ | 62/630 |
| 3,656,312 | * 4/1972 | Streich ................................. | 62/630 |
| 3,956,415 | * 5/1976 | Cummings et al. ................ | 62/630 |
| 3,983,711 | * 10/1976 | Solomon ............................. | 62/630 |
| 4,464,189 | * 8/1984 | Tedder ................................ | 62/630 |
| 4,540,422 | * 9/1985 | Hampton ............................. | 62/630 |
| 4,817,394 | 4/1989 | Erickson ............................. | 62/22 |
| 4,854,954 | 8/1989 | Erickson ............................. | 62/22 |
| 4,897,098 | * 1/1990 | Pate et al. ........................... | 62/630 |
| 5,167,125 | * 12/1992 | Agrawal ............................. | 62/630 |
| 5,577,394 | 11/1996 | Rathbone ........................... | 62/653 |
| 5,673,571 | * 10/1997 | Manley .............................. | 62/631 |
| 5,680,775 | * 10/1997 | Manley .............................. | 62/630 |

OTHER PUBLICATIONS

Triantafyllou, C. et al., "The Design and Optimisation of Fully Thermally Coupled Distillation Columns", *Trans IChemE.*, pp. 118–132 vol. 70(A), Part A, Mar. 1992.

Rudd, H., "Thermal Coupling for Energy Efficiency", Supplement to the Chemical Engineer, pp. S14–S15, Aug. 27, 1992.

Agrawal, Rakesh, "Synthesis of Distillation Column Configurations for a Multicomponent Separation", *Ind. Eng. Chem. Res. 1996*, 35, 1059–1071.

Sargent, R. W. H., "A Functional Approach to Process Synthesis and its Application to Distillation Systems",.*Computers Chem. Eng.*, vol. 22, pp. 31–45, 1998.

* cited by examiner

*Primary Examiner*—Ronald Capossela
(74) *Attorney, Agent, or Firm*—Willard Jones, II

(57) ABSTRACT

An efficient and easier to operate distillation process separates mixtures containing three of more components into streams enriched in one of the components. The invention converts a two-way communication between two distillation columns of a prior art thermally coupled distillation system into a one-way communication. Either a distillation section is added to one of the two distillation columns or a new distillation column is added, and only a liquid stream is transferred from one distillation column to another distillation column thereby eliminating the implementation of the return vapor stream between the same locations of the two columns. More than one distillation column produces product streams of at least one of the most volatile or the least volatile major constituent components.

35 Claims, 19 Drawing Sheets

PROCESSES FOR MULTICOMPONENT SEPARATION

CROSS-REFERENCE TO RELATED APPLICATIONS

Not Applicable.

STATEMENT REGARDING FEDERALLY SPONSORED RESEARCH FOR DEVELOPMENT

Not Applicable.

BACKGROUND OF THE INVENTION

The present invention pertains to the field of distillation of multicomponent fluid mixtures, and in particular to distillation processes for separating a ternary mixture having components, A, B and C (mixture ABC) into three product streams each enriched in one of the components, where A is the most volatile component and C is the least volatile component.

To separate a ternary mixture ABC into almost pure components a distillation process must use at least two distillation columns. Five such distillation processes are well known in the prior art: direct sequence, indirect sequence, side rectifier, side stripper and fully thermally coupled columns. (For example, see page 711 of the book entitled "Separation Processes" by C. J. King, McGraw-Hill, 1981). Of all the prior art ternary distillation processes, the fully thermally coupled column system requires the least amount of heat duty ("Minimum Energy Requirements of Thermally Coupled Distillation Systems", Z. Fidkowski and L. Królikowski, AICHE Journal, pages 643–653, volume 33, 1987). In spite of this attractive performance, the fully thermally coupled column system has not been used widely in commercial applications, in part because of operating problems.

FIG. 1 shows a fully thermally coupled column (FC) process. A feed mixture containing components A, B and C (stream 100) is fed to a first distillation column 110, where the feed stream is separated into two streams (122, 132) that are primarily binary mixtures. The liquid (stream 122) from the bottom of this distillation column is primarily a binary mixture composed of components B and C. Similarly, the vapor (stream 132) from the top of this distillation column is primarily a binary mixture composed of components A and B. Both of these primarily binary mixture streams 122 and 132 are fed to different locations of a second distillation column 120. A portion of the liquid from the bottom of a second distillation column 120 is recovered as C-enriched product stream 190, and another portion of this liquid is boiled in reboiler 182 and returned as vapor stream 192 to provide boilup for the second distillation column 120. The vapor from the top of second distillation column 120 is condensed in condenser 112, and a portion is recovered as A-enriched product stream 170 while the other portion (stream 172) is returned to provide the needed liquid reflux for this distillation column. The B-enriched product stream 180 is produced from an intermediate location of second distillation column 120. (A location of a distillation column is an "intermediate location" when there is at least one separation stage above and one separation stage below that location. A "separation stage" is a mass transfer contact device between liquid and vapor phases, such as a suitable mass transfer tray or a packed height of a suitable packing.) This withdrawal location (intermediate location) is in between the feed locations of the two primarily binary feed streams 122 and 132.

The first distillation column 110 does not use a reboiler or a condenser. The boilup at the bottom of this column is provided by feeding a vapor stream 127 from the second distillation column 120. It is important to note that the withdrawal location of vapor stream 127 is from the same location of the second distillation column 120 as the feed location of the primarily binary liquid stream 122. This leads to a two-way communication between the two distillation columns. (In a two-way communication mode, when a vapor stream is sent from one column to another column, then a return liquid stream is implemented between the same locations of the two columns.) Similarly, the liquid reflux stream 137 to the top of the first distillation column 110 forms another two-way communication between the two distillation columns since stream 137 is withdrawn from the second distillation column 120 at the same location as the feed location of vapor stream 132. It is taught in the prior art that two two-way communications are needed to achieve the lowest heat demand for ternary distillation.

While the heat demand for the process in FIG. 1 with two two-way communications is lowest, it rarely has been used. The lack of use has often been attributed to fear of control problems ("Thermal Coupling for Energy Efficiency", H. Rudd, Supplement to the Chemical Engineer, pages S14–S15, Aug. 27, 1992; "The Design and Optimization of Fully Thermally Coupled Distillation Columns", C. Triantafyllou and R. Smith, Trans. IChemE, pages 118–132, Volume 70(A), 1992). One of the often cited concerns is the flexibility to control the flows over a wide range both at the top and bottom ends of the first distillation column 110. For the vapor AB in stream 132 to flow from first distillation column 110 to the second distillation column 120, it is required that the pressure at the top of the first distillation column 110 be greater than the pressure at the feed point of stream 132 in the second distillation column 120. At the same time, for the vapor BC in stream 127 to flow from the second distillation column 120 to the first distillation column 110 it is necessary that the pressure at the bottom of first distillation column 110 be lower than the pressure at the originating point of stream 127 in the second distillation column. This leads to an unique restriction that the pressure at the bottom of the first distillation column 110 be lower than the pressure at a point in the bottom section of the second distillation column 120, and at the same time, the pressure at the top of the first distillation column must be higher than the pressure at a point in the top section of the second distillation column. This requires careful adjustment of pressures in both of the columns and presents operating concerns for plants requiring wide ranges of variation in flow rates and other operating parameters. C1 early, there is a need for alternative column arrangements with higher operating flexibility while maintaining lower heat demand for distillation.

It is worth noting that both of the liquid transfer streams 137 and 122 at the top and bottom of the first distillation column 110 flow in a direction opposite of the flow of the vapor streams (122, 132) at each end. This requires that either a pump be used on each of the liquid streams or that the relative heights of the two columns be adjusted to allow each of the liquid streams to be transferred through gravity.

Recently, Agrawal and Fidkowski introduced the process shown in FIG. 2 (U.S. Pat. No. 5,970,742) In this figure, the bottom end of first distillation column 110 has a two-way communication with the bottom section of second distillation column 120 and the top end of the first distillation column 110 has only one-way communication with the top section of the second distillation column 120. Thus, liquid stream 122 from the bottom end of the first distillation column 110 is sent to the bottom section of second distillation column 120. A vapor stream 127 is withdrawn from the second distillation column 120 and sent to the bottom of the first distillation column 110. A portion of the vapor stream exiting from the top end of the first distillation column 110 is sent as stream 132 to the second distillation column 120. Unlike FIG. 1, there is no liquid return stream to the top of the first distillation column from the second distillation column. Instead, a portion of the vapor stream (stream 234) from the top of the first distillation column 110 is condensed in condenser 215 and returned as liquid reflux in line 236. Once again, a vapor stream (stream 132) is transferred from the first distillation column to the second distillation column and a second vapor stream (stream 127) is transferred in the reverse direction. This leads to some of the same operating challenges as described for the process in FIG. 1.

Recently, Agrawal and Fidkowski (U.S. Patent Application Serial No. 6,106,674) suggested the use of an alternative equivalent configuration of FIG. 3 to solve the problem of careful control of pressure profiles in the distillation columns of the configuration in FIG. 1. In this solution, the distillation section 6 and the associated reboiler 182 from the second distillation column 120 (of FIG. 2) is moved to the first distillation column 110 below the distillation section 2 in FIG. 3. This leads to a two-way connection in which vapor stream 350 enriched in components B and C is transferred from the first distillation column 110 to the bottom of the second distillation column 120, and a liquid stream 352 is returned from the bottom of the second distillation column 120 to the first distillation column 110. Note that now both the vapor streams 132 and 350 are transferred from the first distillation column to the second distillation column. Therefore, the first distillation column 110 can be operated at a pressure higher than that of the second distillation column 120, and the flow of vapor streams 132 and 350 can be controlled by using control valves in either one or both of the lines transporting those streams.

While the configuration in FIG. 3 is more operable than the one in FIG. 1, the presence of vapor flow between the columns is less desirable. Generally, this vapor flow is very sensitive to the pressure drop in the lines. Therefore, the pressure drop across the control valves or the pressure difference between the columns have to be carefully monitored and controlled.

There are other ternary distillation processes with only one two-way communication between the two distillation columns. The two well-known processes are side stripper and side rectifier. The side stripper configuration is shown in FIG. 4. This prior art process can be easily derived from the configuration shown in FIG. 3. Now distillation section 3 and the associated condenser 112 is located on top of distillation section 1 of the first distillation column 110. However, the second distillation column 420 has only section 4. Distillation section 5 is eliminated and in its place, reboiler 440 is used to provide the boilup to the second distillation column 420 (also known as a side stripper column). Component B is recovered from the bottom of the second distillation column 420. Vapor and liquid streams 433 and 438 establish the two-way communication between the distillation columns.

Another ternary process with one two-way and one one-way communication between the two distillation columns suggested by Agrawal and Fidkowski (U.S. Pat. No. 5,970,742) is shown in FIG. 5. The difference between this figure and the prior art process of FIG. 1 is that no vapor stream 127 is transferred from the second distillation column 120 to the first distillation column 110. Instead, a portion of the liquid stream from the bottom of the first distillation column 110 is boiled in the reboiler 528 and fed to the bottom of the first distillation column as stream 526. Note that there still is a vapor transfer stream 132 between the two distillation columns.

The same challenge exists when mixtures containing more than three components are distilled to produce product streams each enriched in one of the components. The reason being that the distillation processes with low heat demand used to distill mixtures with more than three components are made up of multiple two-way and one-way communications between the distillation columns. Therefore, deficiencies of the ternary subprocesses also are carried to the distillation of mixtures containing a greater number of components. Some known examples of four and five component distillation processes are described in a paper by Agrawal ("Synthesis of Distillation Column Configurations for a Multicomponent Separation", Ind. Eng. Chem. Res., volume 35, pages 1059–1071, 1996) and a paper by Sargent ("A Functional Approach to Process Synthesis and its Application to Distillation Systems", Computers Chem. Eng., volume 22, pages 31–45, 1998).

A sequential four-component separation process with at least four two-way communications is shown in FIG. 6. The feed mixture ABCD is distilled into four product streams (170,180, 660, 690). In this mixture, the relative volatility follows the alphabetical order, i.e., A is the most volatile, D is the least volatile and B is more volatile than C. The first distillation column 610 has two two-way communications with the second distillation column 620 which in turn has at least two (generally three) more two-way communications with the third distillation column 630. C1 early, the challenges associated with the vapor transfers between the distillation columns now are much greater as the pressure profiles in all of the three distillation columns must be carefully controlled.

A four-component separation process with a dual satellite column arrangement is shown in FIG. 7. The feed mixture ABCD is fed to the main column (first distillation column) 710. There are two satellite columns (720, 730) each with two two-way communications with the main column. There is shown a possibility of having a liquid and vapor flow between the two satellite columns. The product stream 170 enriched in the most volatile component A is produced from the top of the main column 710 and the product stream 790 enriched in the least volatile component D is produced from the bottom of this column. Product streams (760, 780) enriched in components of intermediate volatility (C, B) are produced from each of the satellite columns (720, 730). For each satellite column, in order to transfer vapor streams between columns, the pressure at the bottom of the satellite column must be lower than the pressure at a point in the bottom section of the main column and simultaneously, the pressures at the top of the satellite columns must be greater than the pressure in the top corresponding section of the main column. Furthermore, pressures of each of the satellite columns have to be adjusted to allow the flow of vapor and liquid streams enriched in component B and C in proper direction between the two satellite columns. All this presents a great deal of difficulty in the operation of such integrated processes with multiple two-way communications between the distillation columns.

In a typical cryogenic air distillation system recovering oxygen and argon products, air at a high pressure is fed to a high pressure column. In the high pressure column the air is separated into liquid nitrogen at the top and an oxygen-enriched bottoms liquid known as crude liquid oxygen. This crude liquid oxygen, which is primarily a ternary mixture of nitrogen, argon and oxygen, is fed to a low pressure column. In the low pressure column, crude liquid oxygen is separated into nitrogen at the top and oxygen at the bottom. An argon enriched vapor feed is withdrawn from an intermediate location of the low pressure column below the crude liquid oxygen feed and fed to a side rectifier. An argon product stream is produced from the top of the side rectifier and liquid from the bottom is returned to the low pressure column. For this process, with the objective to reduce energy consumption, Erickson in U.S. Pat. Nos. 4,817,394 and 4,854,954 suggested a number of modifications.

In FIG. 4 of U.S. Patent No. 4,817,394, Erikson provided the condensing duty to the argon producing column at the top and at an intermediate height by vaporizing crude liquid oxygen in two stages. This vaporization of crude liquid oxygen in two stages produces two vapor streams of different oxygen concentrations that are fed to two different locations of the low pressure column. Furthermore, the argon producing column is extended by adding an additional section at the bottom of this column and a liquid stream is withdrawn from the low pressure column and fed to this column. The argon column is operated at a pressure significantly lower than the low pressure column and boilup at its bottom is provided by condensing nitrogen from the top of the high pressure column. Unlike the conventional oxygen and argon producing distillation columns, the bottom of the low pressure column is now boiled by either a partial or a total condensation of a portion of the feed air stream. U.S. Pat. No. 4,817,394 states that the key to the feasibility of these triple pressure configurations is that two vapor streams are fed to the low pressure column. In the configuration of FIG. 5 of U.S. Pat. No. 4,817,394, where one vapor stream is fed to the low pressure column, the second vapor stream is produced in the low pressure column by the condensation of a vapor stream from an intermediate height of the argon producing column. Both U.S. Pat. Nos. 4,817,394 and 4,854,954 insist that the argon producing column be operated about ⅓ to ½ bar lower in pressure than the low pressure column. This decreases the pressure of the feed supply air and leads to savings in energy consumption. However, condensation of a portion of the feed air at the bottom of the low pressure column deprives the distillation column of nitrogen reflux and leads to lower argon recoveries.

Subsequently, in U.S. Pat. No. 5,577,394, Rathbone described a flowsheet that essentially is similar to the one described in U.S. Pat. Nos. 4,817,394 and 4,854,954. The only significant difference is that Rathbone provides the second vapor to the low pressure column by condensing a portion of the nitrogen vapor from the top of the high pressure column at an intermediate height of the low pressure column. Once again, the objective of this patent is the same as the other two cited patents, i.e., to save energy.

None of the cited patents have tried to solve the general problem of either reducing or eliminating the vapor transfer between the columns in the thermally coupled columns of the prior art processes to improve their operability. In the thermally coupled columns such as the ones shown in FIGS. 1 through 7, the vapor flows are sensitive to pressure differences between the columns. This problem is particularly more challenging for the thermally coupled configurations with two or more connections between any two distillation columns wherein at least one of the connections is a two-way communication.

It is desired to have more operable multicomponent distillation processes having efficiencies that are similar to or better than the efficiencies of the prior art thermally coupled processes.

BRIEF SUMMARY OF THE INVENTION

The present invention is a distillation process which separates mixtures containing three or more components having different volatilities into at least three product streams.

A first embodiment of the invention is a process for distillation of a multicomponent fluid containing at least three components, each component having a different volatility, into at least three product streams. The process uses at least two distillation columns, including a first distillation column and a second distillation column. Each distillation column has a top, a bottom, and at least two distillation sections between the top and the bottom. The process comprises multiple steps. The first step is to feed the multicomponent fluid into the first distillation column at a feed location between two of the at least two distillation sections of the first distillation column. The second step is to separate at least a portion of at least one component from the other components of the multicomponent fluid in the first distillation column, thereby forming at least one mixture stream lean in the at least one component. The next step is to transfer from the first distillation column to another distillation column (i) a mixture stream lean in a least volatile component in a one-way communication and/or (ii) a mixture stream lean in a most volatile component in another one-way communication. When the transfer is of (i) a mixture lean in a least volatile component, then a distillation section adjacent the top of the first distillation column and a distillation section adjacent the top of the second distillation column each perform substantially similar tasks. When the transfer is of (ii) a mixture stream lean in a most volatile component, then a distillation section adjacent the bottom of the first distillation column and a distillation adjacent the bottom of the second distillation column each perform substantially similar tasks, and at least one other communication occurs between any of the at least two distillation columns. The final step is to remove from the at least two distillation columns a stream rich in the most volatile component at the top of the at least two distillation columns and/or a stream rich in the least volatile component at the bottom of the at least two distillation columns.

The multicomponent fluid in the first step may be from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

There are several variations of the first embodiment. For example, in one variation each stream removed at the top of the at least two distillation columns is a product stream. In another variation, each stream removed at the bottom of the at least two distillation columns is a product stream.

In yet another variation of the first embodiment, (i) the mixture stream lean in the least volatile component is a liquid stream, and/or (ii) the mixture stream lean in the most volatile component is a liquid stream. A second embodiment of the invention has the same steps as this variation of the first embodiment, but includes two additional steps. The first additional step is to withdraw at least one liquid stream from one of the at least two distillation columns. The second additional step is to feed the at least one liquid stream to an intermediate location of another one of the at least two distillation columns.

In a third embodiment, which has the same multiple steps as the second embodiment, the at least one other communication that occurs between any of the at least two distillation columns is a one-way communication whereby another mixture stream is transferred from one of the at least two distillation columns to another one of the at least two distillation columns.

In the fourth embodiment, which has the same multiple steps of the second embodiment and includes four additional steps, the at least one other communication that occurs between any of the at least two distillation columns is a two-way communication. The first additional step is to withdraw a liquid mixture stream from a first location of one of the at least two distillation columns. The second additional step is to feed the liquid mixture stream to a second location of another one of the at least two distillation columns. The third additional step is to withdraw a vapor mixture stream simultaneously from the second location. The fourth additional step is to feed the vapor mixture stream to the first location.

Another aspect of the present invention is a cryogenic air separation unit using a process as in the first embodiment.

A fifth embodiment is an improved process for distillation of a multicomponent fluid containing at least three components, each component having a different volatility, into multiple product streams. The improved process uses at least two distillation columns that are thermally coupled, and each distillation column has a top and a bottom. The first distillation column and the second distillation column have at least one two-way communication wherein a liquid mixture stream withdrawn from the first or second distillation column is fed to the other distillation column at a first location and a vapor mixture stream is simultaneously withdrawn from the first location and fed to the distillation column from which the liquid stream is withdrawn. The liquid stream is lean in the least volatile component and/or the most volatile component, there being at least one other communication between any two of the at least two distillation columns when the liquid mixture is lean in the most volatile component. The improvement of the improved process includes two steps. The first step is to convert at least one two-way communication between the first distillation column and the second distillation column to a one-way communication between the first distillation column and the second distillation column. The second step is to remove from the first and second distillation columns at least three product streams, each product stream enriched in one of the components.

As with the first embodiment of the invention, the multicomponent fluid in the fifth embodiment may be selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 to hydrocarbons or $C_4$ isomers.

In a sixth embodiment, which has the same multiple steps of the fifth embodiment and includes two additional steps, the at least one two-way communication involves a mixture containing a most volatile component and being lean in a least volatile component. The first additional step is to add a distillation section between the top of the first or second distillation column and a distillation section adjacent the top of said first or second distillation column, whereby a vapor withdrawn from the top of said first or second distillation column is enriched in the most volatile component. The second additional step is to establish a one-way communication between the first and second distillation columns, wherein a liquid mixture stream is withdrawn from an intermediate location of the first or second distillation column and is fed to the other distillation column, said liquid mixture stream containing components identical to the components in the at least one two-way communication converted to the one-way communication.

There are several variations of the sixth embodiment. In one variation, the liquid mixture is withdrawn from the distillation column having the additional distillation section. In another variation, the liquid mixture is withdrawn from the distillation column which does not have the additional distillation section.

In yet another variation of the sixth embodiment, the step of removing from the first and second distillation columns at least four product streams, each stream enriched in one of the components, comprises four sub-steps. The first sub-step is to remove a first product stream rich in the most volatile component from the top of the first distillation column. The second sub-step is to remove a second product stream rich in the least volatile component from the bottom of the first distillation column. The third sub-step is to remove a third product stream from the bottom of the second distillation column, the third product stream being rich in a component having an intermediate volatility, said intermediate volatility being between the volatility of the most volatile component and the volatility of the least volatile component. The fourth sub-step is to remove a fourth product stream enriched in the most volatile component from the top of the second distillation column.

In yet another variation of the sixth embodiment, the step of removing from the first and second distillation columns at least four product streams, each stream enriched in one of the components, comprises four sub-steps. The first sub-step is to remove a first product stream rich in the most volatile component from the top of the second distillation column. The second sub-step is to remove a second product stream rich in the least volatile component from the bottom of the second distillation column. The third sub-step is to remove a third product stream rich in a component having an intermediate volatility from an intermediate location of the second distillation column, said intermediate volatility being between the volatility of the most volatile component and the volatility of the least volatile component. The fourth sub-step is to remove a fourth product stream enriched in the most volatile component from the top of the first distillation column.

In yet another variation of the sixth embodiment, the step of removing from the first and second distillation columns at least four product streams, each stream enriched in one of the components, comprises four sub-steps. The first sub-step is to remove a first product stream rich in the most volatile component from the top of the first distillation column. The second sub-step is to remove a second product stream rich in the least volatile component from the bottom of the first distillation column. The third sub-step is to remove a third product stream enriched in the most volatile component from the top of the second distillation column. The fourth sub-step is to remove a fourth product stream rich in a component having an intermediate volatility from an intermediate location of the second distillation column, the intermediate volatility being between the volatility of the most volatile component and the volatility of the least volatile component.

There is yet another variation of the sixth embodiment wherein the step of removing from the first and second distillation columns at least five product streams, each stream enriched in one of the components, comprises five sub-steps. The first sub-step is to remove a first product stream rich in the most volatile component from the top of the first distillation column. The second sub-step is to remove a second product stream rich in the least volatile component from the bottom of the first distillation column. The third sub-step is to remove a third product stream enriched in the most volatile component from the top of the second distillation column. The fourth sub-step is to remove a fourth product stream enriched in the least volatile component from the bottom of the second distillation column. The fifth sub-step is to remove a fifth product stream rich in a component having an intermediate volatility from an intermediate location of the second distillation column, said intermediate volatility being between the volatility of the most volatile component and the volatility of the least volatile component.

In a seventh embodiment, which has the same steps as the fifth embodiment and includes two additional steps, the at least one two-way communication involves a mixture containing a least volatile component and being lean in a most volatile component. The first additional step is to add a distillation section between the bottom of the first or second distillation column and a distillation section adjacent the bottom of said first or second distillation column whereby a liquid withdrawn from the bottom of the said first or second distillation column is enriched in the least volatile component. The second additional step is to establish a one-way communication between the first and second distillation columns, wherein a liquid mixture stream is withdrawn from an intermediate location of the first or second distillation column and is fed to the other distillation column, said liquid mixture stream containing components identical to the components in the at least one two-way communication converted to the one-way communication.

There are several variations of the seventh embodiment. For example, in one variation the liquid mixture is withdrawn from said distillation column having the additional distillation section. In another variation, the liquid mixture is withdrawn from the distillation column which does not have the additional distillation section.

In another variation of the seventh embodiment, the step of removing from the first and second distillation columns at least four product streams, each stream enriched in one of the components, comprises four sub-steps. The first sub-step is to remove a first product stream rich in the most volatile component from the top of the second distillation column. The second sub-step is to remove a second product stream rich in the least volatile component from the bottom of the second distillation column. The third sub-step is to remove a third product stream rich in a component having an intermediate volatility from an intermediate location of the second distillation column, said intermediate volatility being between the volatility of the most volatile component and the volatility of the least volatile component. The fourth sub-step is to remove a fourth product stream enriched in the least volatile component from the bottom of the first distillation column.

In another variation of the seventh embodiment, the step of removing from the first and second distillation columns at least four product streams, each stream enriched in one of the components, includes four sub-steps. The first sub-step is to remove a first product stream rich in the most volatile component from the top of the first distillation column. The second sub-step is to remove a second product stream rich in the least volatile component from the bottom of the first distillation column. Third sub-step is to remove a third stream enriched in the least volatile component from the bottom of the second distillation column. The fourth sub-step is to remove a fourth product stream rich in a component having an intermediate volatility from an intermediate location of the second distillation column, said intermediate volatility being between the volatility of the most volatile component and the volatility of the least volatile component.

In yet another variation of the seventh embodiment, the step of removing from the first and second distillation columns at least five product streams, each stream enriched in one of the components, comprises five sub-steps. The first sub-step is to remove a first product stream rich in the most volatile component from the top of the first distillation column. The second sub-step is to remove a second product stream rich in the least volatile component from the bottom of the first distillation column. The third sub-step is to remove a third product stream enriched in the most volatile component from the top of the second distillation column. The fourth sub-step is to remove a fourth product stream enriched in the least volatile component from the bottom of the second distillation column. The fifth sub-step is to remove a fifth product stream rich in a component having an intermediate volatility from an intermediate location of the second distillation column, said intermediate volatility being between the volatility of the most volatile component and the volatility of the at least volatile component.

In an eighth embodiment, which has the steps of the fifth embodiment and includes three additional steps, the at least one two-way communication involves a mixture stream being lean in a most volatile component and lean in a least volatile component. The first additional step is to provide another distillation column having a top and a bottom whereby a vapor withdrawn from the top of said distillation column is enriched in the most volatile component and a liquid withdrawn from the bottom of said distillation column is enriched in the least volatile component. The second additional step is to withdraw a liquid mixture from the first or second distillation column, said liquid mixture containing components identical to the components in the at least one two-way communication. The third additional step is to feed said liquid mixture to the another distillation column.

In addition to the two steps of the fifth embodiment, a ninth embodiment includes two additional steps. The first additional step is to heat exchange the withdrawn liquid mixture. The second additional step is to feed the heat exchanged liquid mixture to another distillation column.

In addition to the two steps of the fifth embodiment, a tenth embodiment includes three additional steps. The first additional step is to transfer the withdrawn liquid mixture to a storage tank. The second additional step is to withdraw the liquid mixture from the storage tank. The third additional step is to fee d the liquid mixture withdrawn from the storage tank to another distillation column.

In addition to the two steps of the fifth embodiment, an eleventh embodiment includes the further step of condensing a plurality of vapor streams enriched in a most volatile component in at least two condensers. In a variation of this embodiment, the at least two condensers are combined in one heat exchanger.

In addition to the two steps of the fifth embodiment, a twelfth embodiment includes the further step of boiling a plurality of liquid streams enriched in a least volatile component in at least two reboilers. In a variation of this embodiment, the at least two reboilers are combined in one heat exchanger.

Finally, another aspect of the present invention is a cryogenic air separation unit using a process as in the fifth embodiment.

BRIEF DESCRIPTION OF THE DRAWINGS

The invention will be described by way of example with reference to the accompanying drawings in which.

DETAILED DESCRIPTION OF THE INVENTION

Figure 1:
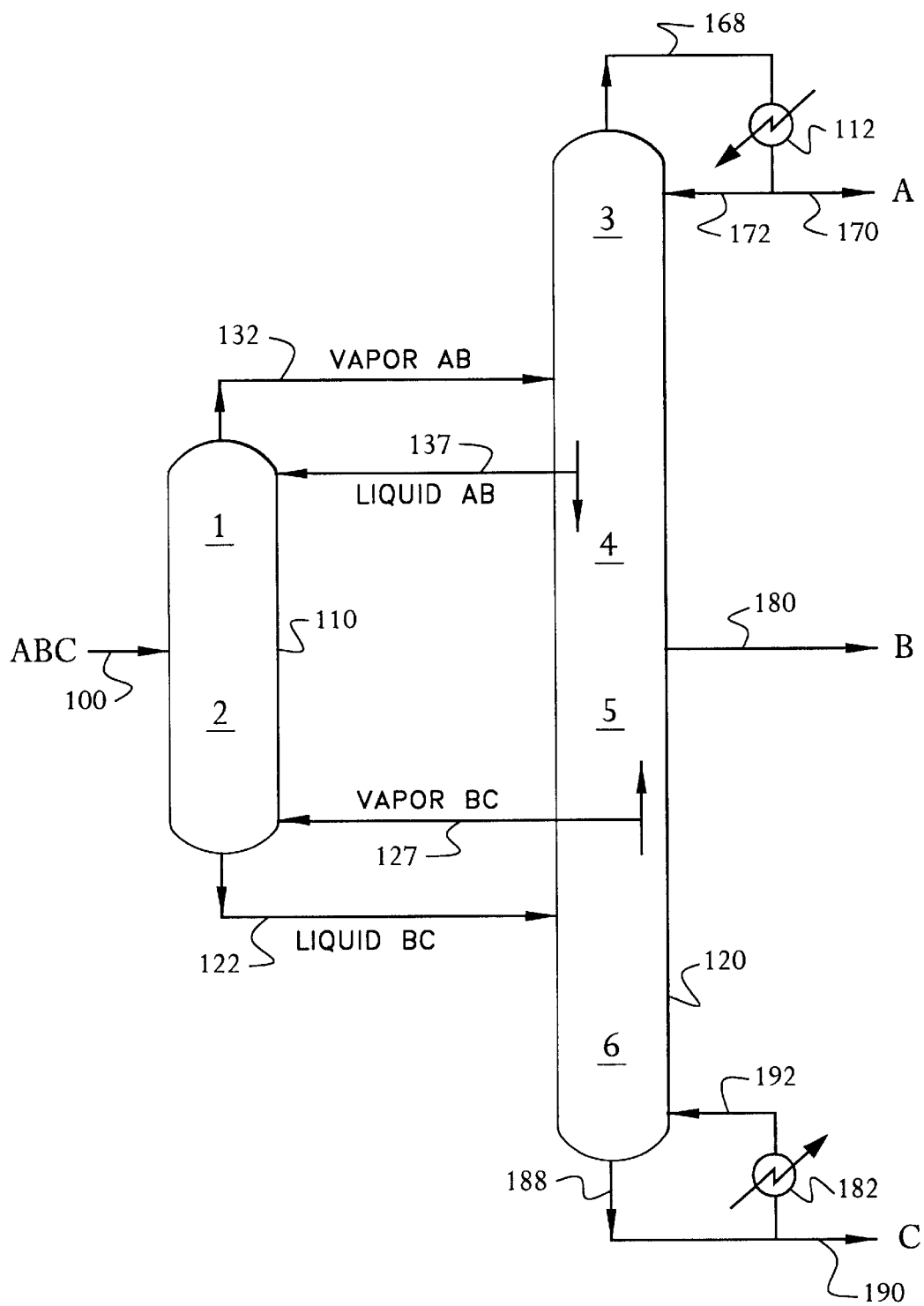
FIGS. 1 through 7 illustrate schematic diagrams of seven prior art processes.

The current invention is an improvement to a conventional thermally coupled distillation column system for the separation of a feed containing three or more major constituent components of different relative volatilities into product streams enriched in one of the major constituent components, wherein the conventional thermally coupled distillation column system comprises:

(a) at least two distillation columns;

(b) feeding the feed stream containing three or more major constituent components to a distillation column;

(c) utilizing a distillation column that produces a vapor stream enriched in the most volatile major constituent component at the top and providing a liquid reflux stream to the top of this column;

(d) utilizing a distillation column that produces a liquid stream enriched in the least volatile major constituent component at the bottom and feeding a vapor stream to the bottom as a vapor boilup to this distillation column;

(e) using at least one two-way communication between two distillation columns involving mixtures that are lean in the least volatile major constituent component or a two-way communication involving any mixture in conjunction with at least another one-way or two-way communication between any two distillation columns;

(f) a two-way communication between any two distillation columns established by withdrawing a liquid mixture stream from one distillation column and feeding it to another distillation column and at the same time withdrawing a vapor stream from the same location where the liquid mixture stream is fed to another column and feeding this vapor stream to the location of the distillation column from where the liquid mixture stream was withdrawn; and (g) a one-way communication between any two distillation columns established by withdrawing a vapor or a liquid mixture from one distillation column and eventually feeding it to another distillation column without any return stream from the same location of another distillation column to the location of the distillation column from where the vapor or the liquid mixture was withdrawn.

The improvement includes converting at least one two-way communication between any two distillation columns to a one-way communication between the same two distillation columns by one of the following steps:

(i) if the two-way communication involves a mixture that contains the most volatile major constituent and is lean in the least volatile major constituent, then a distillation section is added above one of the two distillation columns such that vapor from the top of this distillation column is now enriched in the most volatile major constituent and provides a portion of product stream enriched in the most volatile major constituent and a liquid reflux stream is fed to the top of this distillation column, and a liquid mixture stream containing the same major constituents as were present in the original two-way communication is withdrawn from an intermediate location of a distillation column involved in the original two-way communication and eventually fed to a suitable location of another distillation column also involved in the original two-way communication; or (ii) if the two-way communication involves a mixture that contains the least volatile major constituent and is lean in the most volatile major constituent, then a distillation section is added below one of the two distillation columns such that liquid from the bottom of this distillation column is now enriched in the least volatile major constituent and provides a portion of product stream enriched in the least volatile major constituent and a vapor boilup stream is fed to the bottom of this distillation column, and a liquid mixture stream containing the same major constituents as were present in the original two-way communication is withdrawn from an intermediate location of a distillation column involved in the original two-way communication and eventually fed to a suitable location of another distillation column also involved in the original two-way communication; or (iii) if the two-way communication involves a mixture that is lean in both the most volatile and the least volatile major constituents, then a new distillation column is added such that vapor from the top of this new distillation column is now enriched in the most volatile constituent and provides a portion of product stream enriched in the most volatile major constituent and a liquid reflux stream is fed to the top of this column, and a liquid from the bottom of this new distillation column is now enriched in the least volatile major constituent and provides a portion of product stream enriched in the least volatile major constituent and a vapor boilup stream is fed to the bottom of this column, and a liquid mixture containing the same major constituents as in the mixture of the original two-way communication is withdrawn and fed to this new distillation column.

It is worth nothing that the final distillation processes resulting from the current invention are characterized by the fact that more than one distillation column recover product streams that are enriched in either the most volatile major constituent and/or in the least volatile major constituent. The product streams enriched in the most volatile major constituent may or may not have the same composition. The same would hold for the product stream enriched in the least volatile major constituent.

When a two-way communication is converted to a one-way communication by withdrawing a liquid mixture stream from one of the distillation columns and transferring it to another distillation column, the liquid mixture consists of the same major constituents as were present in the vapor and liquid mixture streams involved in the original two-way communication. However, the exact composition of the liquid mixture stream involved in the one-way communication may or may not be the same as the composition of either of the streams involved in the original two-way communication.

At the top end of a distillation column producing a vapor stream enriched in the most volatile major constituent, a condenser can be used whereby a portion of this vapor stream is condensed and returned to the distillation column as liquid reflux. Similarly, at the bottom end of a distillation column producing a liquid stream enriched in the least volatile major constituent, a reboiler can be used whereby a portion of this liquid stream is boiled and returned to the distillation column as vapor boilup.

The invention will now be described in detail with reference to processes shown in FIGS. 8 through 19.

Consider the separation of a ternary mixture containing three constituent components A, B and C. Sometimes, besides these three major constituent components, other components also may be present in small amounts in a feed mixture. Of the three major constituent components, A is the most volatile and C is the least volatile. The objective is to separate the ternary feed mixture into three product streams each enriched in one of the three major constituent components. FIGS. 8 through 15 show eight processes according to the current invention for the separation of such a ternary feed mixture.

Figure 4:
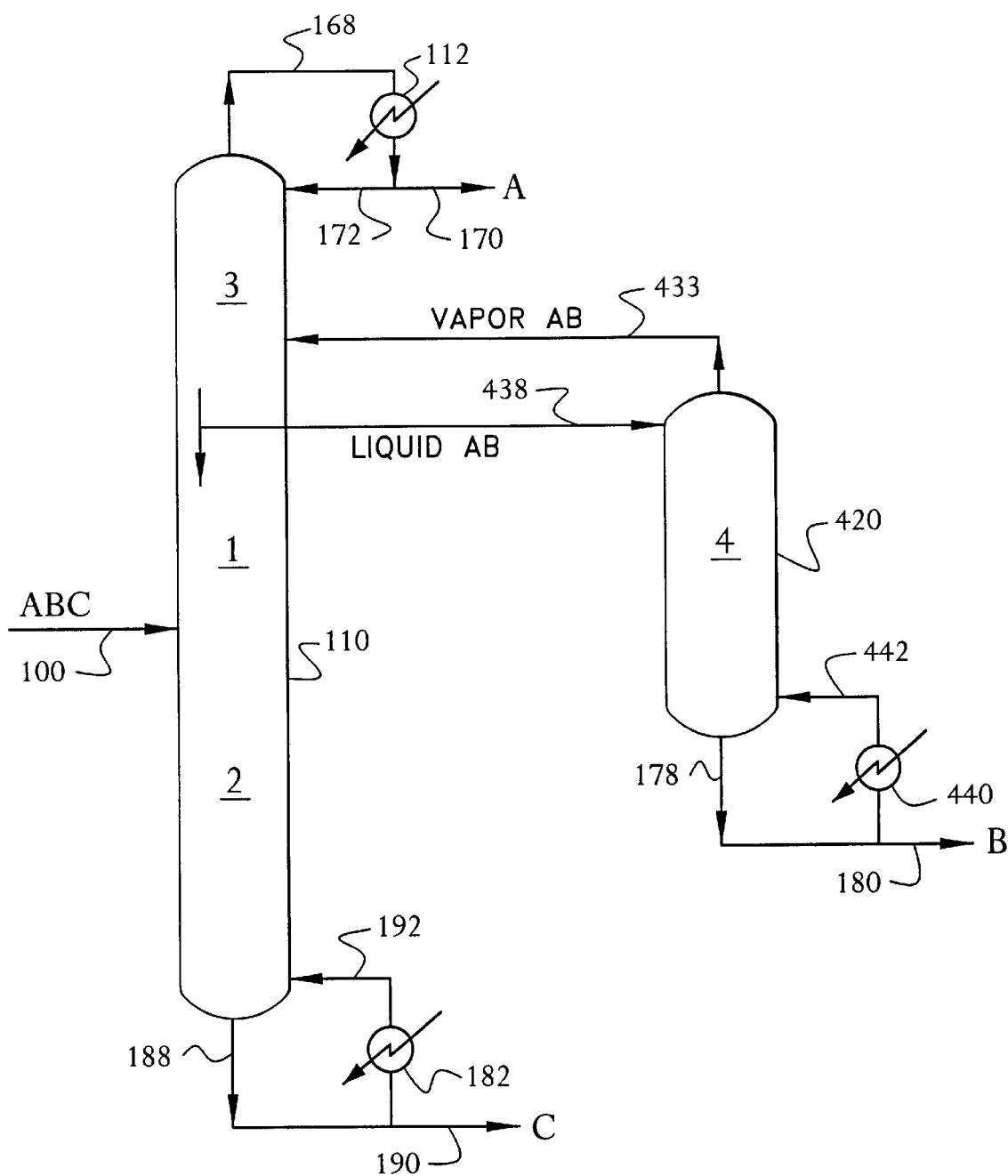
Figure 8:
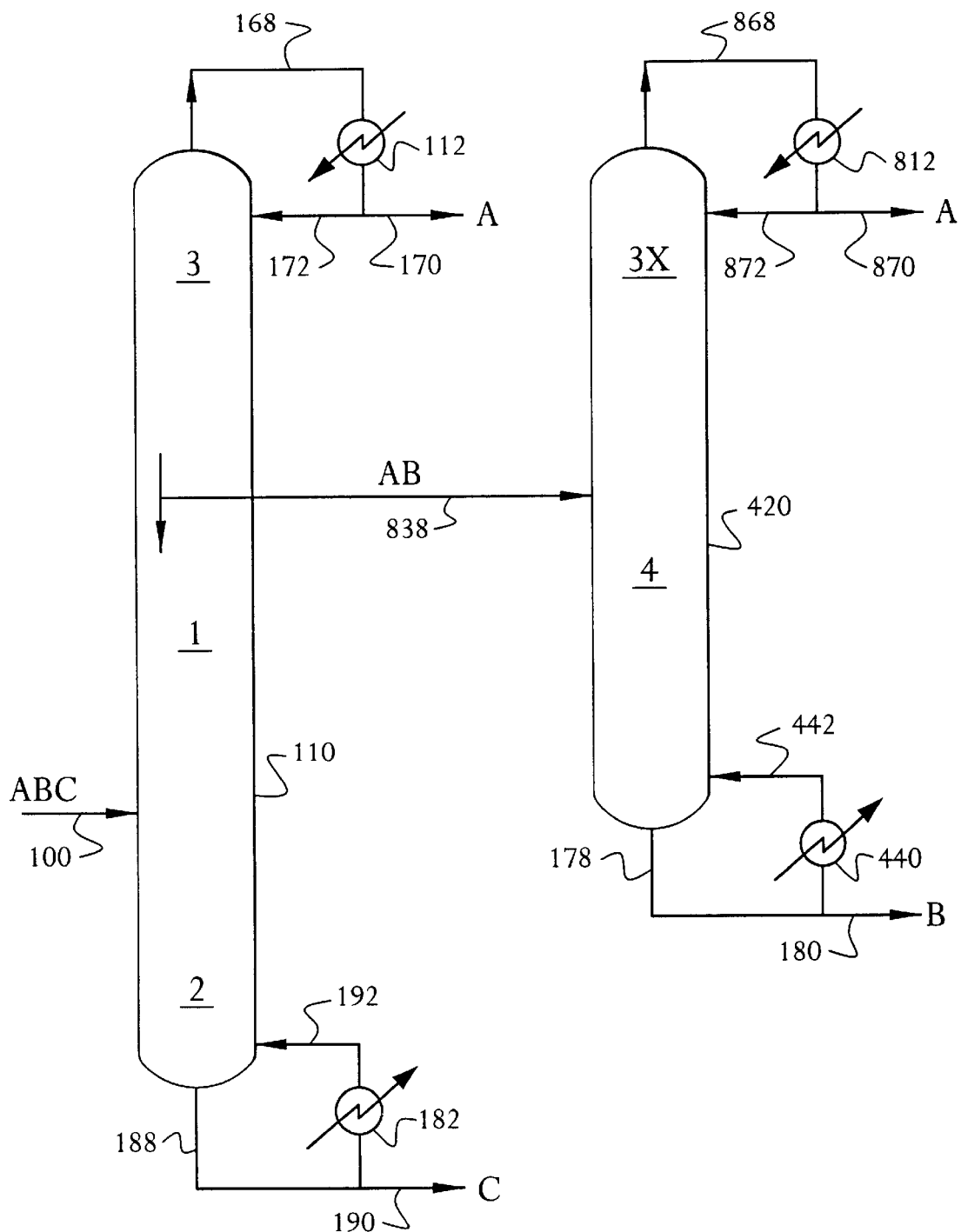
FIG. 8 is a schematic diagram of an embodiment of the present invention.

FIG. 8 shows an improved process according to the current invention which has been derived from the conventional thermally coupled side stripper process of FIG. 4. The side stripper process is an example with only one two-way communication between two distillation columns involving mixtures that are lean in the least volatile major constituent component C and contain the most volatile major constituent A.

In FIG. 8, the ternary feed stream 100 is fed to the first distillation column 110. The product stream enriched in the least volatile major constituent component C is recovered from the bottom of distillation column 110 as stream 190. The boilup at the bottom of this column is provided through reboiler 182. A portion of the product stream 168 enriched in the most volatile constituent component A is recovered as stream 170 from the top of the distillation column 110. A liquid mixture stream 838, primarily enriched in components A and B is withdrawn from an intermediate location between distillation sections 1 and 3 of the distillation column 110 and fed to an intermediate location of the second distillation column 420. From the bottom of this column 420, a product stream 180 enriched in the major constituent component B of intermediate volatility is produced. The boilup to this column is provided through reboiler 440. As compared to the prior art process of FIG. 4 and according to the step (i) of the current invention, a distillation section 3x is added above the distillation section 4. Now the vapor stream 868 from the top of this distillation column is enriched in the most volatile major constituent component A. While a portion of it is recovered as product stream 870, the remaining portion is condensed in condenser 812 and returned to the distillation column as liquid reflux stream 872. Now there are two product streams 170 and 870 that are enriched in the most volatile major constituent component A. There is no restriction on the composition of each of these streams relative to the other, i.e., the composition of each could be same, similar or quite different. These two streams could be totally mixed, or partially mixed, or kept separate to provide different product streams enriched in the most volatile major constituent component A.

Unlike the prior art process of FIG. 4, in the process of FIG. 8, there is no return vapor stream from the top of the distillation section 4 of the distillation column 420 to the distillation column 110 between distillation sections 1 and 3. Also distillation section 3x is added above distillation column 420 and liquid mixture 838 is withdrawn from distillation column 110. Even though it is not essential, the vapor flow in distillation section 3x generally will be similar to the vapor flow in line 433 of the prior art process of FIG. 4.

It is noted that distillation section 3x performs a substantially similar distillation task as distillation section 3. This means that in both of the distillation sections (3, 3x) an essentially binary mixture AB is distilled to produce streams rich in the most volatile to component A at the top. However, it does not mean that the operating conditions in both of the distillation sections (3, 3x) must be identical. One has a choice to operate each distillation section at any suitable liquid to vapor flow ratios and with the same or different number of separation stages in each section.

Figure 5:
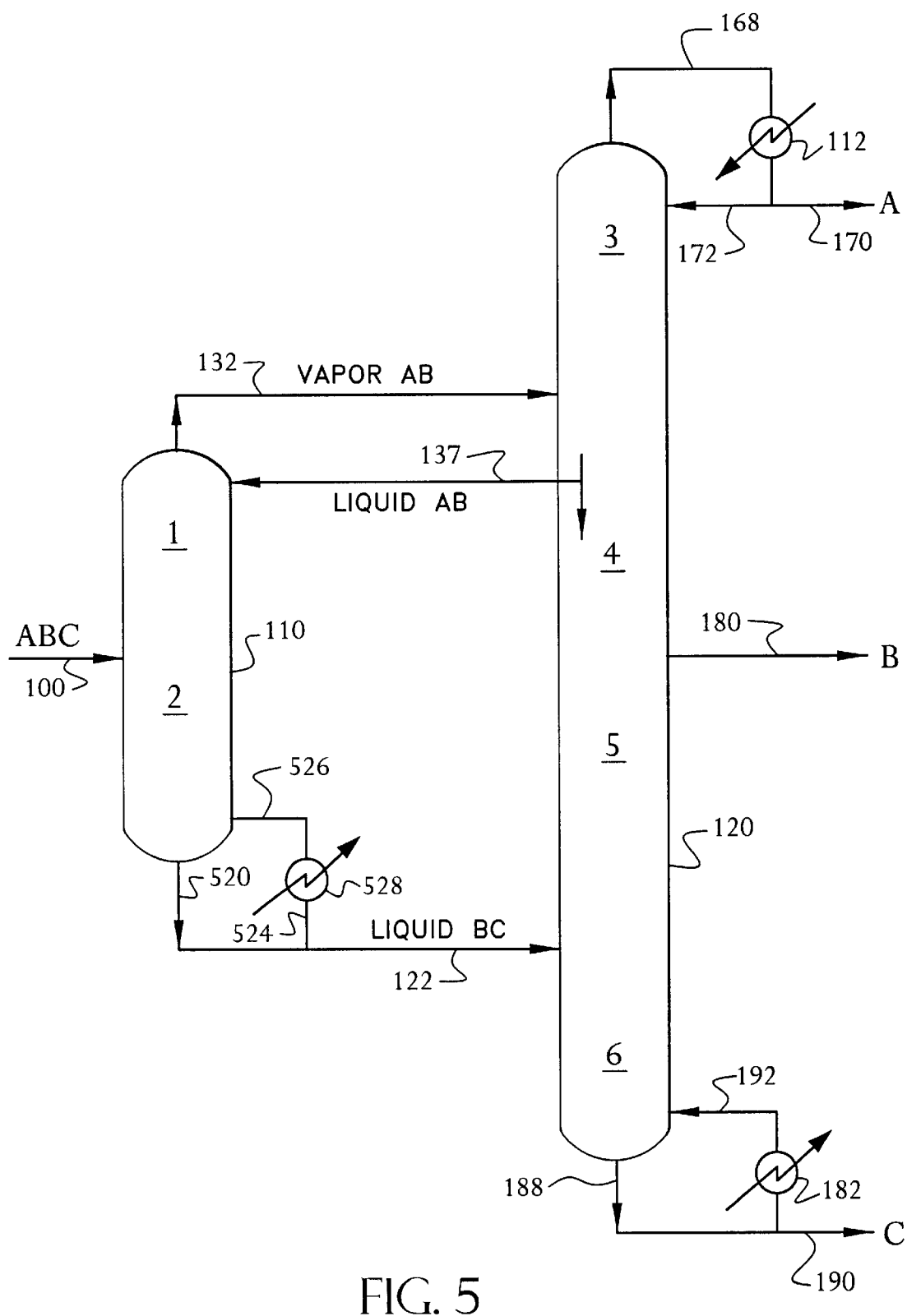
Figure 9:
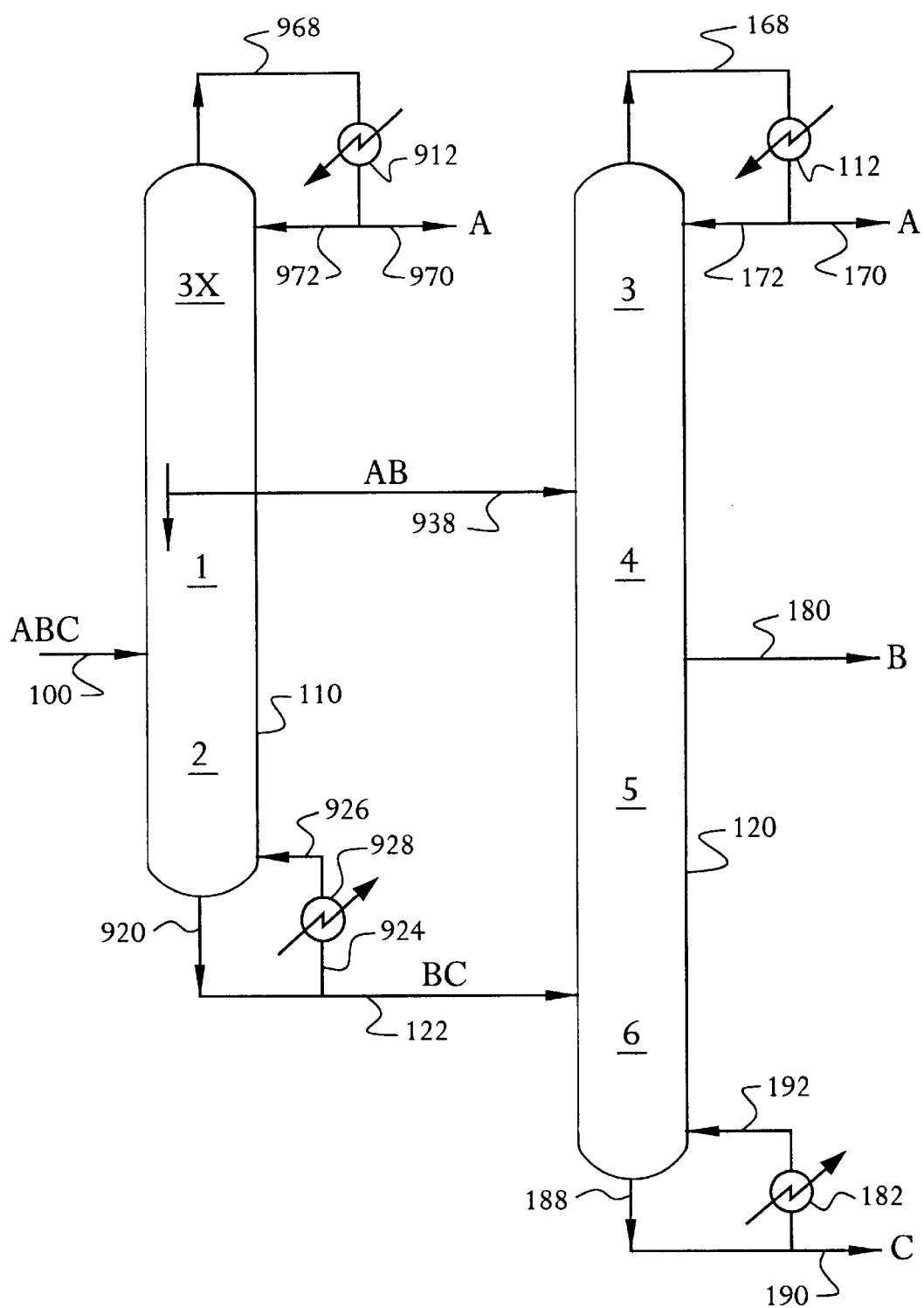
FIG. 9 is a schematic diagram of a second embodiment of the present invention.

FIG. 9 shows a process according to the current invention that has been derived from the prior art thermally coupled column process of FIG. 5. This is an example where in the prior art process, there is one two-way and one one-way communication between the two distillation columns. The one-way communication involves the transfer of a liquid stream 122 that is lean in the most volatile major constituent component A from the bottom of distillation column 110 to the distillation column 120. The two-way communication involves transfer of mixtures that contain the most volatile major constituent A and are lean in the least volatile major constituent component C. Therefore, the process of FIG. 5 is modified according to step (i) of the invention by adding a distillation section 3x above distillation column 110. A vapor stream 968 enriched in the most volatile major constituent component A is withdrawn from the top of this column. A portion of this vapor stream is recovered as a product stream 970 enriched in the most volatile major constituent component A and the remaining portion is condensed and returned as reflux stream 972. A liquid mixture stream 938 is withdrawn between distillation sections 1 and 3x and sent to the distillation column 120. Note that in this example, distillation section 3x is added above distillation column 110 and the liquid mixture 938 is withdrawn from the same distillation column. While the vapor flow rate in distillation section 3x can be any desirable value, generally the value will be similar to the vapor flow rate of stream 132 in the prior art process of FIG. 5.

Figure 2:
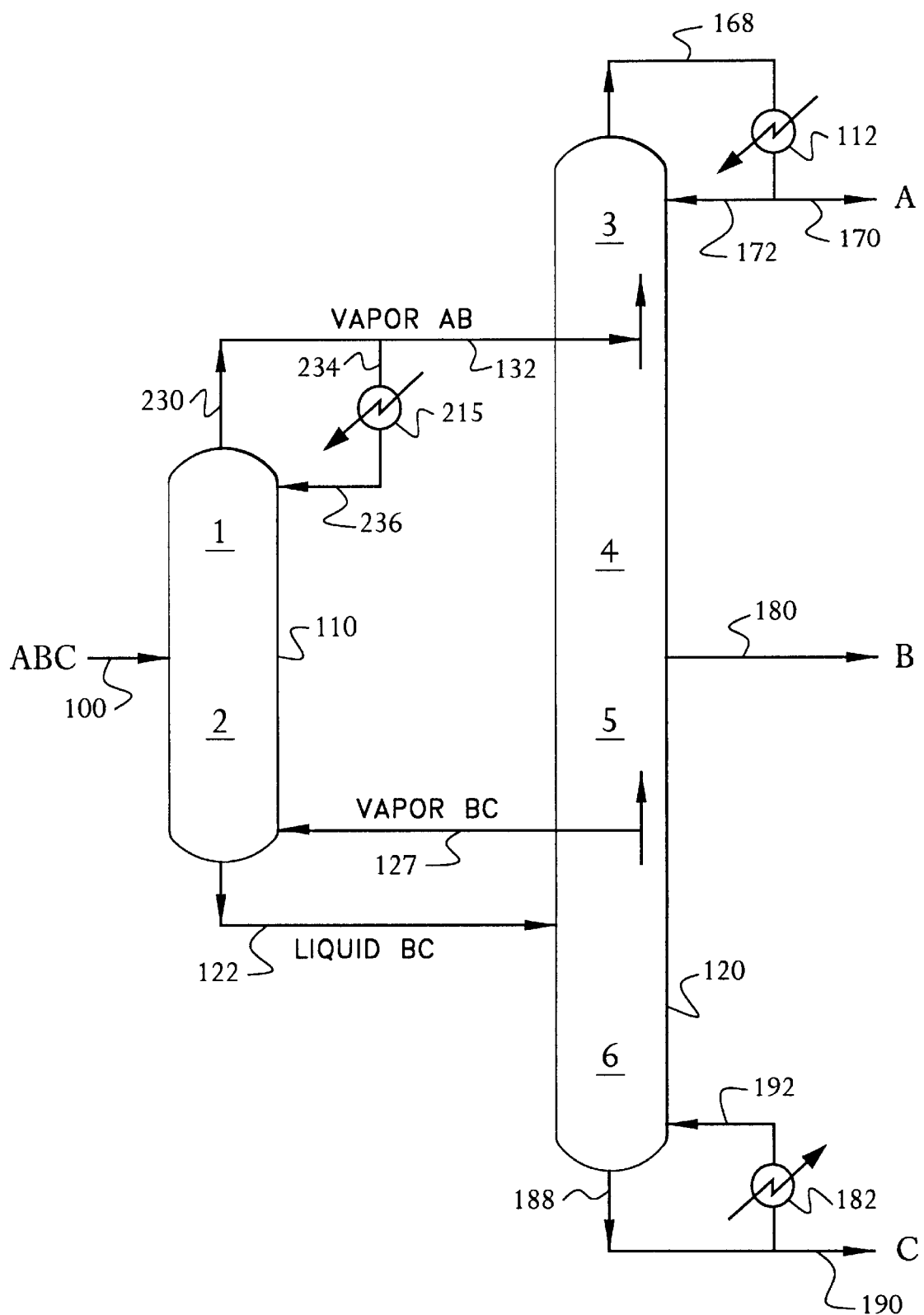
Figure 10:
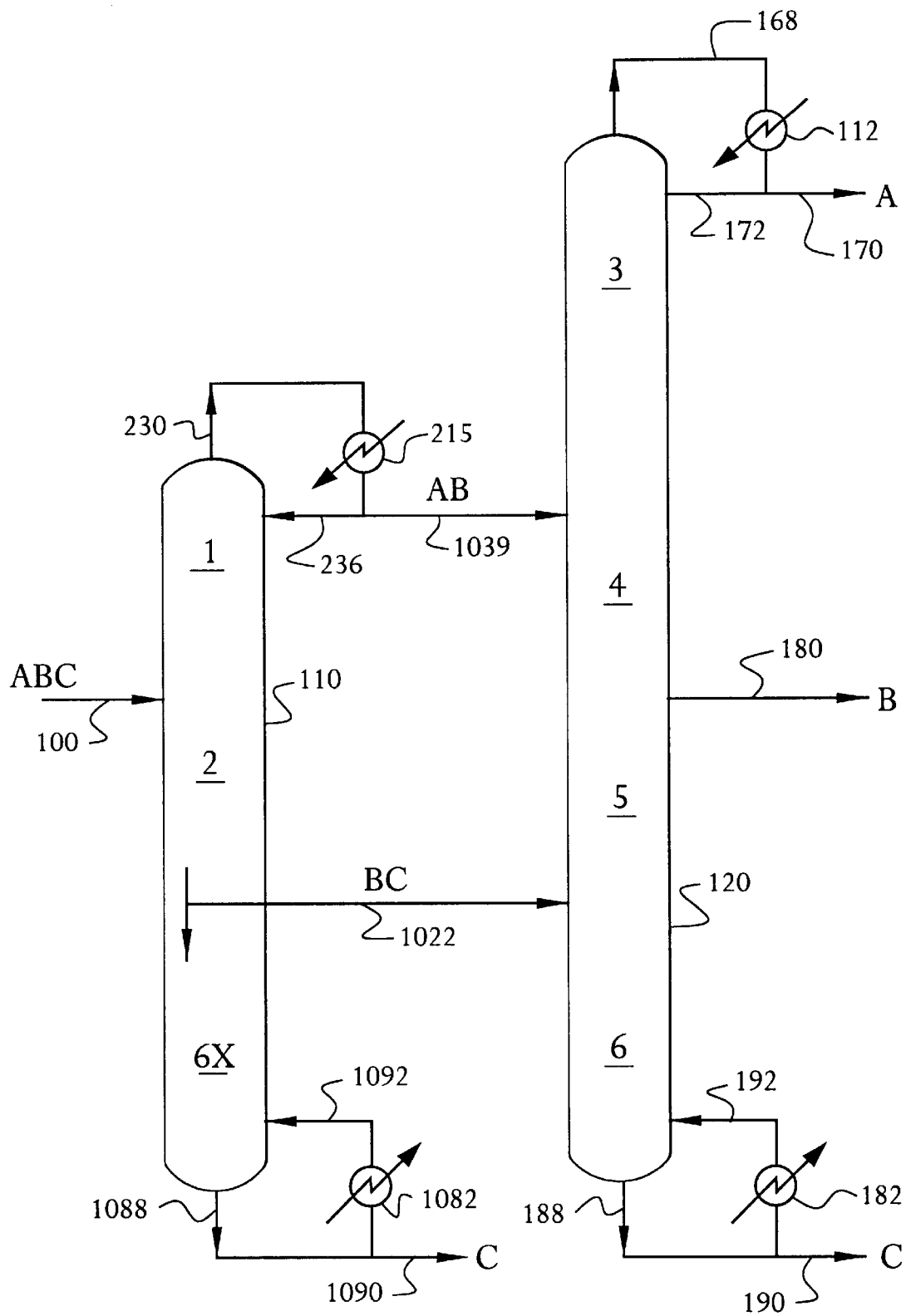
FIG. 10 is a schematic diagram of a third embodiment of the present invention.
Figure 11:
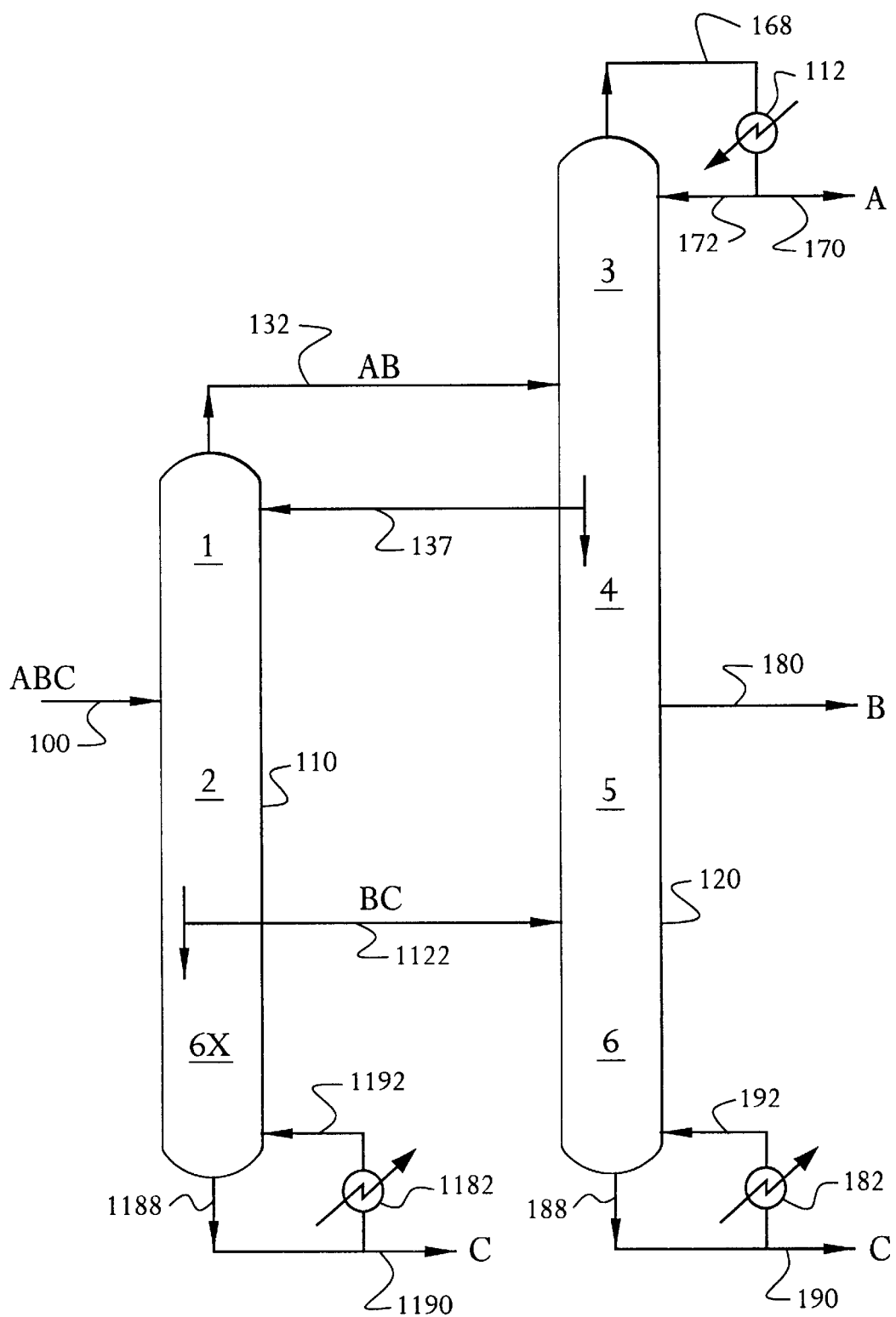
FIG. 11 is a schematic diagram of a fourth embodiment of the present invention.

FIG. 10 shows a process according to the current invention that has been derived from the prior art process of FIG. 2. This is an example where the prior art thermally coupled process (FIG. 2) has two communications between the two distillation columns. The first communication is a one-way communication using a vapor stream 132 that is lean in the least volatile major constituent C. The second communication is a two-way communication involving mixture BC (stream 127) that is lean in the most volatile major constituent A. Therefore, according to step (ii) of the invention, a distillation section 6x is added below distillation section 2 of distillation column 110. Now, only a liquid mixture stream 1022, lean in the most volatile major constituent A, is withdrawn from an intermediate location below the feed to distillation column 110 and transferred to distillation column 120. A liquid stream 1088 enriched in the least volatile major constituent C is withdrawn from the bottom of distillation section 6x. A portion of stream 1088 is recovered as a product stream 1090 enriched in C, while the other portion is vaporized in reboiler 1082 to provide boilup to distillation column 110. Even though it is not essential, the vapor flow rate in distillation section 6x generally will be similar to that of stream 127 in FIG. 2. Note another difference between the processes of FIG. 2 and FIG. 10 is the manner in which the mixture AB lean in the least volatile major constituent C is transferred from the top of the distillation column 110 to distillation column 120. In FIG. 2, this mixture is transferred as a vapor stream, but in FIG. 10 it is transferred as a liquid stream. While it is possible to transfer this mixture AB as a vapor stream in FIG. 10, this transfer is shown as a liquid stream to demonstrate that along with converting a two-way communication to a one-way communication other changes also could be made to a prior art thermally coupled configuration.

Figure 12:
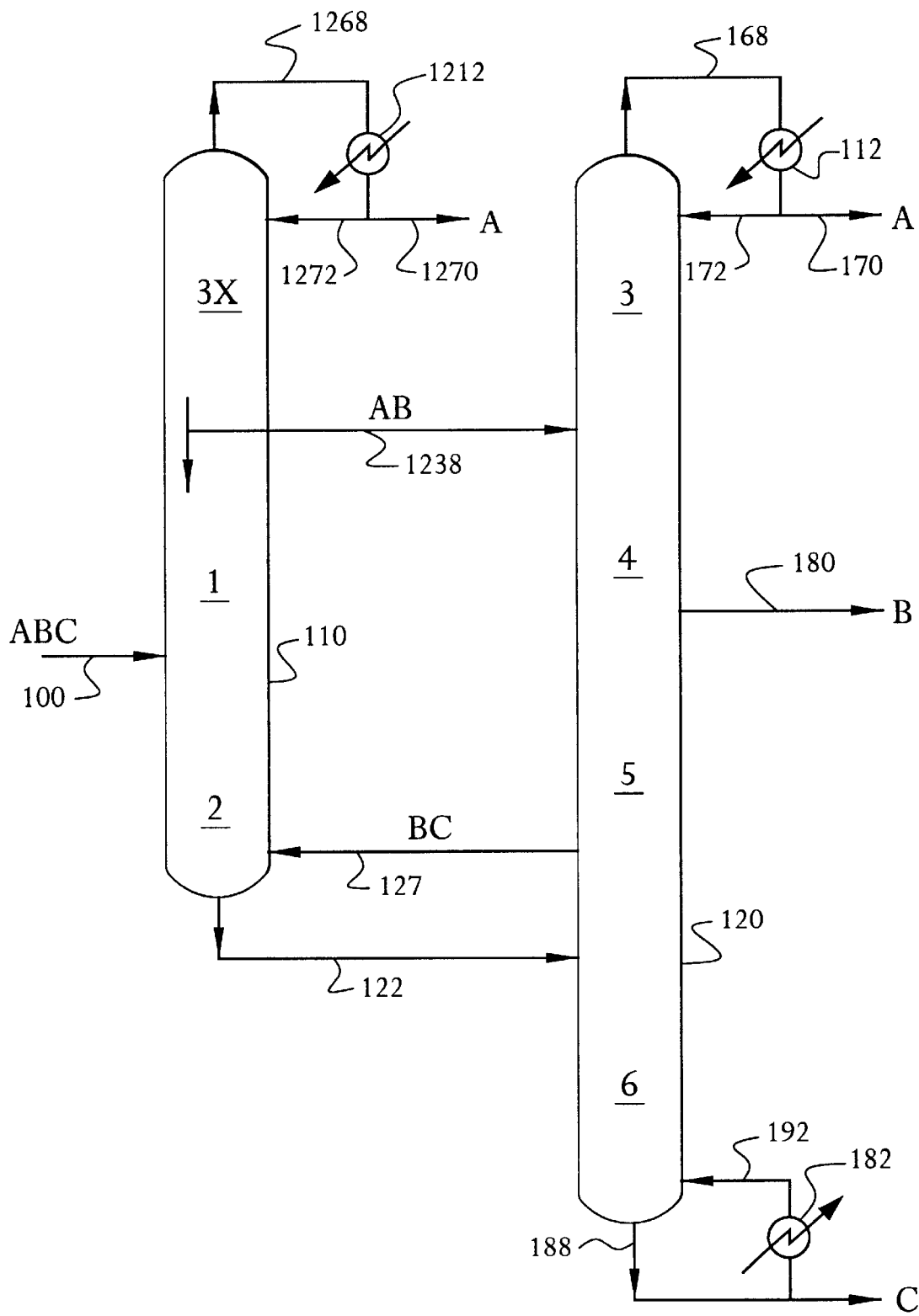
FIG. 12 is a schematic diagram of a fifth embodiment of the present invention.

The fully-coupled prior art process of FIG. 1 has two two-way communication between the two distillation columns. The current invention can be applied either to one of both the two-way communications. This results in three possible flowsheets shown in FIGS. 11 through 13. When the two-way communication involving mixture BC that is lean to in the most volatile major constituent A is converted to a one-way communication, the result is the process shown in FIG. 11. Such a conversion was already described in detail while discussing the process of FIG. 10. The process of FIG. 12 is obtained when the two-way communication involving mixture AB that is lean in the least volatile major constituent C is converted to a one-way communication. Such a conversion was described in detail with reference to FIG. 9. The process of FIG. 13 results when both the two-way communications of FIG. 1 are converted to one-way communications. Note that this new process requires two additional distillation sections and produces two product streams for each of the major constituent components A and C. However, the absence of any vapor transfer streams between the distillation columns makes it easier to operate this configuration.

Figure 3:
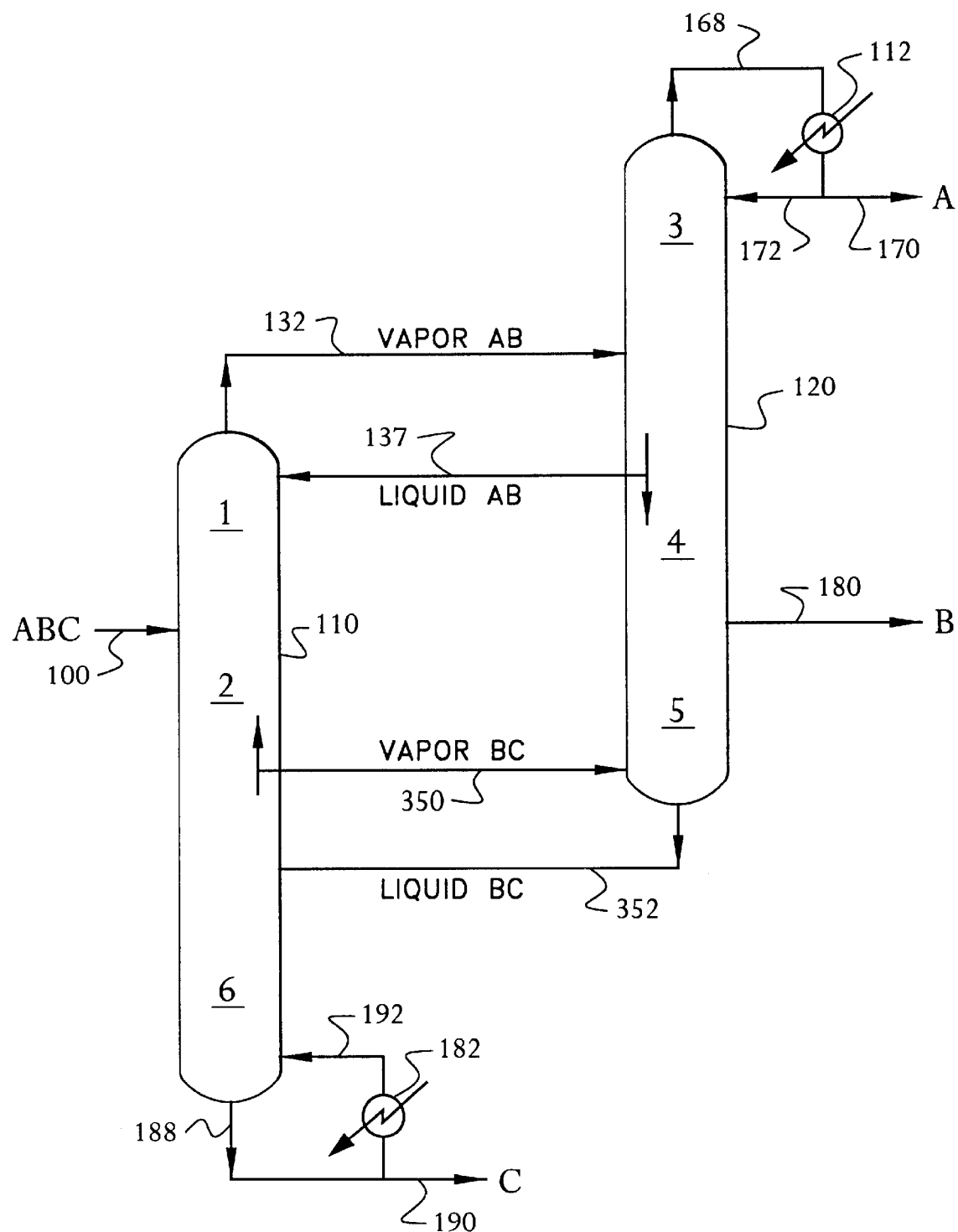
Figure 15:
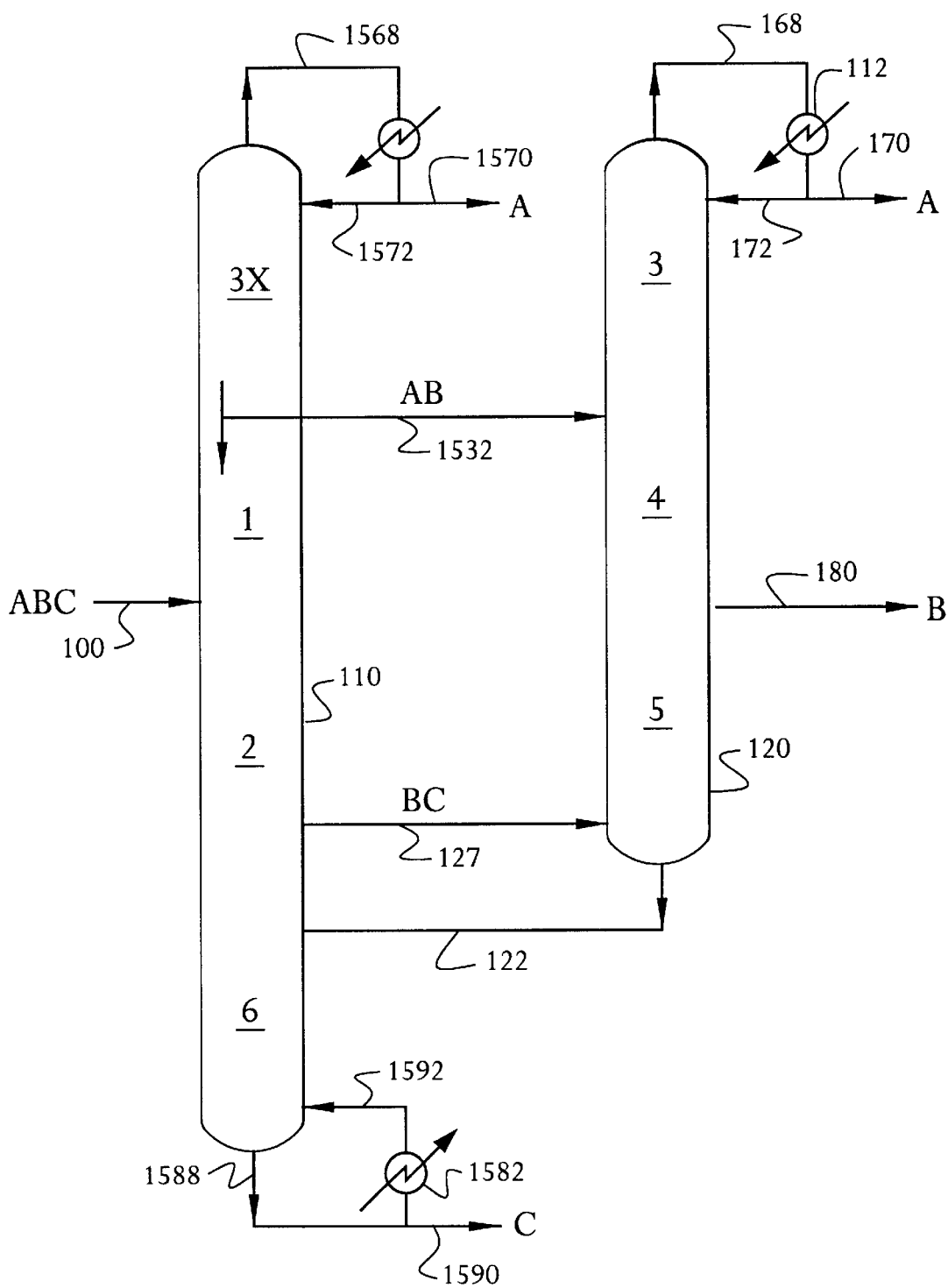
FIG. 15 is a schematic diagram of an eighth embodiment of the present invention.

The fully-coupled prior art configurations of FIGS. 1 and 3 are thermodynamically equivalent and differ in the fact that certain distillation sections are moved from one distillation column to another distillation column. Thus, the process of FIG. 3 is obtained from FIG. 1 by moving distillation section 6 from the distillation column 120 to the distillation column 110. Similar movement of distillation sections can be applied to the configurations resulting from the current invention. For example, the process of FIG. 14 results from the process of FIG. 11 when the distillation section 3 is moved from distillation column 120 to distillation column 110. Similarly, the process of FIG. 15 is obtained by moving distillation section 6 from the distillation column 120 to distillation column 110 in FIG. 12. It also is worth noting that the process of FIG. 15 could be obtained directly from the prior art process of FIG. 3 by applying the current invention to the two-way communication involving vapor mixture AB lean in the least volatile major constituent C.

Figure 6:
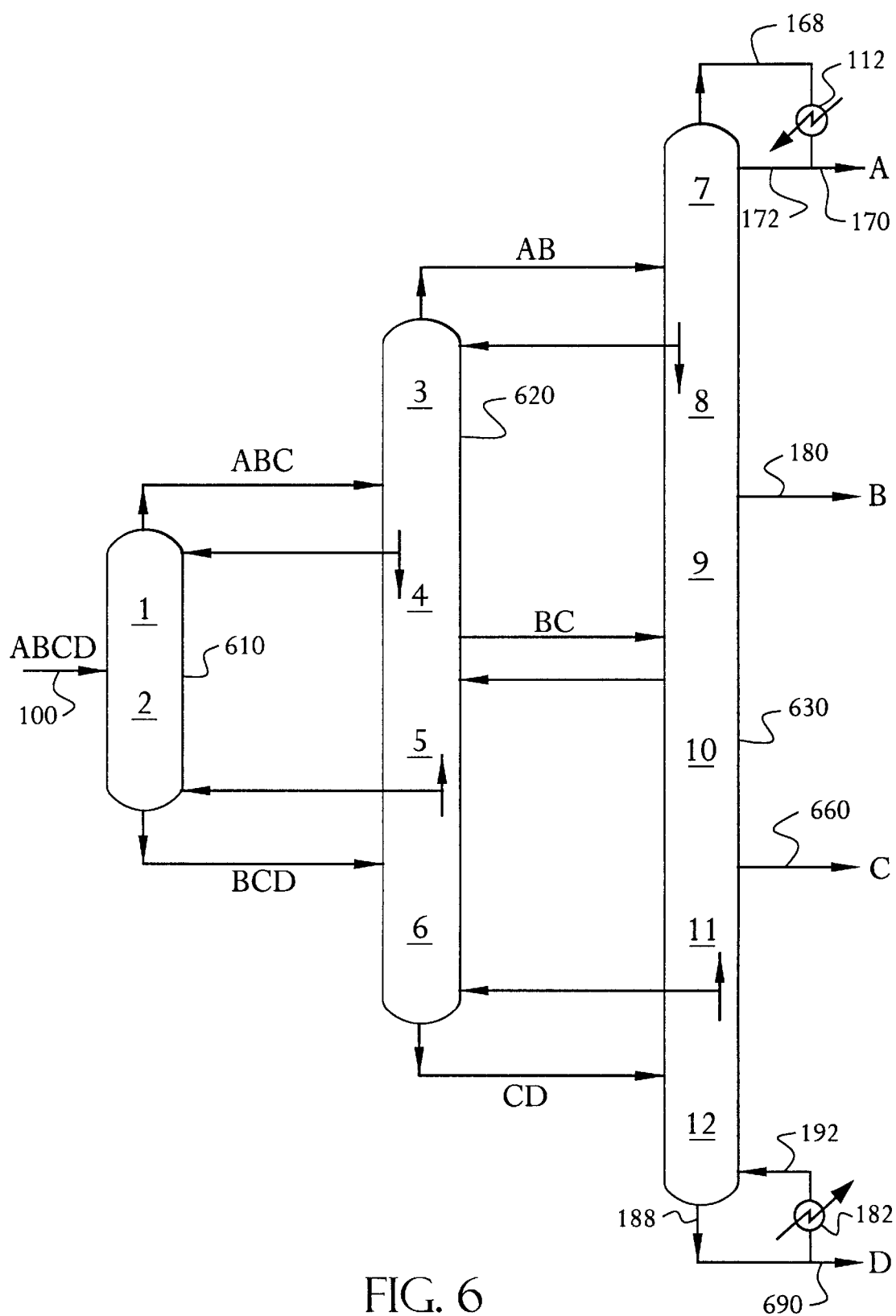
Figure 7:
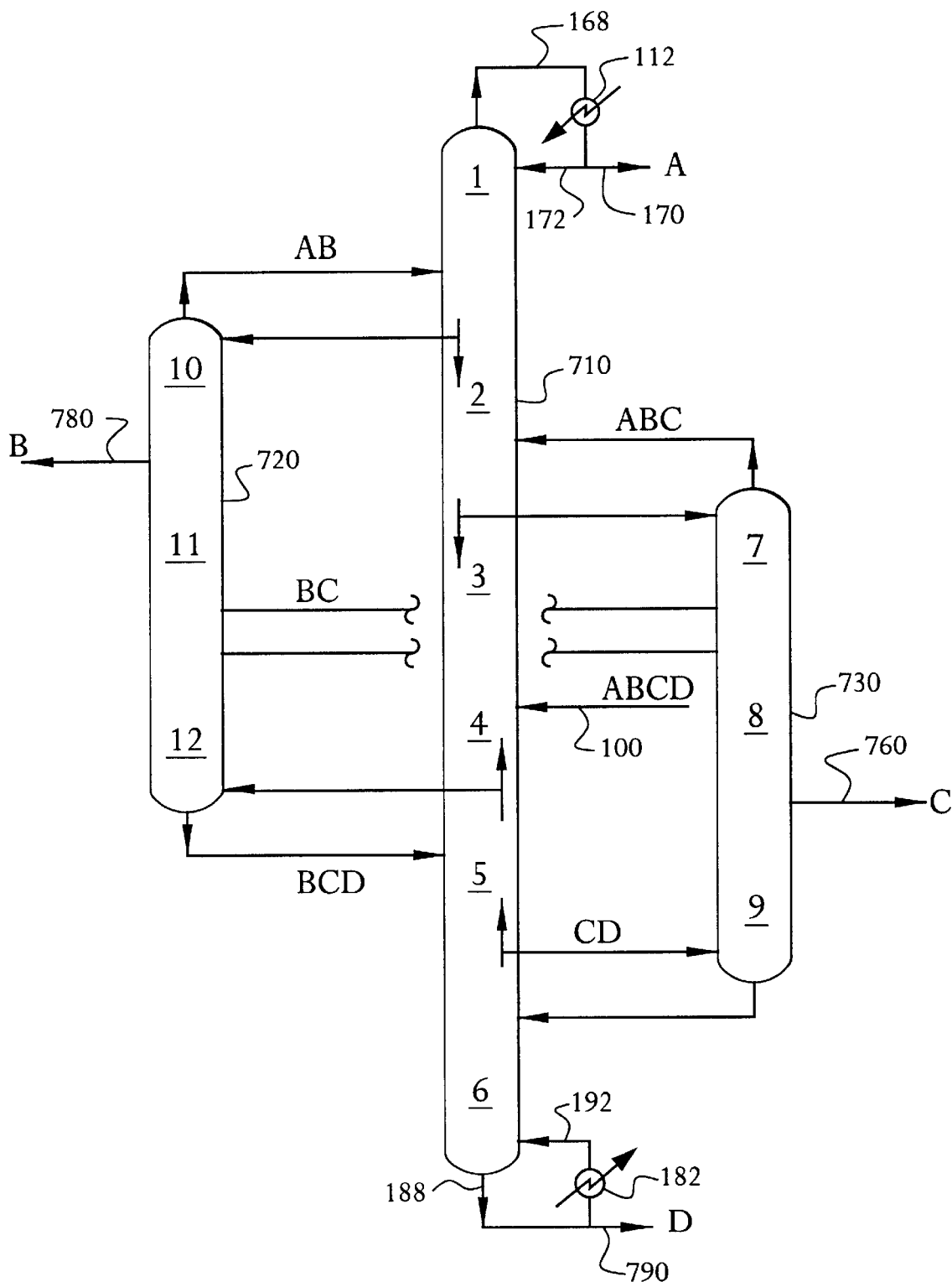

Now consider the separation of a four-component feed mixture consisting of components A, B, C and D. Examples of two conventional fully thermally coupled distillation column systems were described earlier in FIGS. 6 and 7. There are multiple two-way communications between the distillation columns. For the mixtures containing four or more components, the mixtures involved in a two-way communication can be categorized in three groups. The first group of mixtures are lean in the least volatile major constituent component but contain the most volatile major constituent component. In FIGS. 6 and 7, mixtures AB and ABC are such examples. The second group of mixtures are lean in the most volatile major constituent component but contain the least volatile major constituent component. Mixtures CD and BCD are such examples for a four-component mixture. The third group of mixtures are lean in both the most volatile and the least volatile major constituent components and contain only the components of intermediate volatile. The binary mixture BC is such an example in FIGS. 6 and 7. While the current invention can be applied to any number of two-way communications, FIGS. 16 and 17 are derived from FIGS. 6 and 7 by applying the current invention to all the two-way communications involving mixtures from the first and the second groups.

Figure 16:
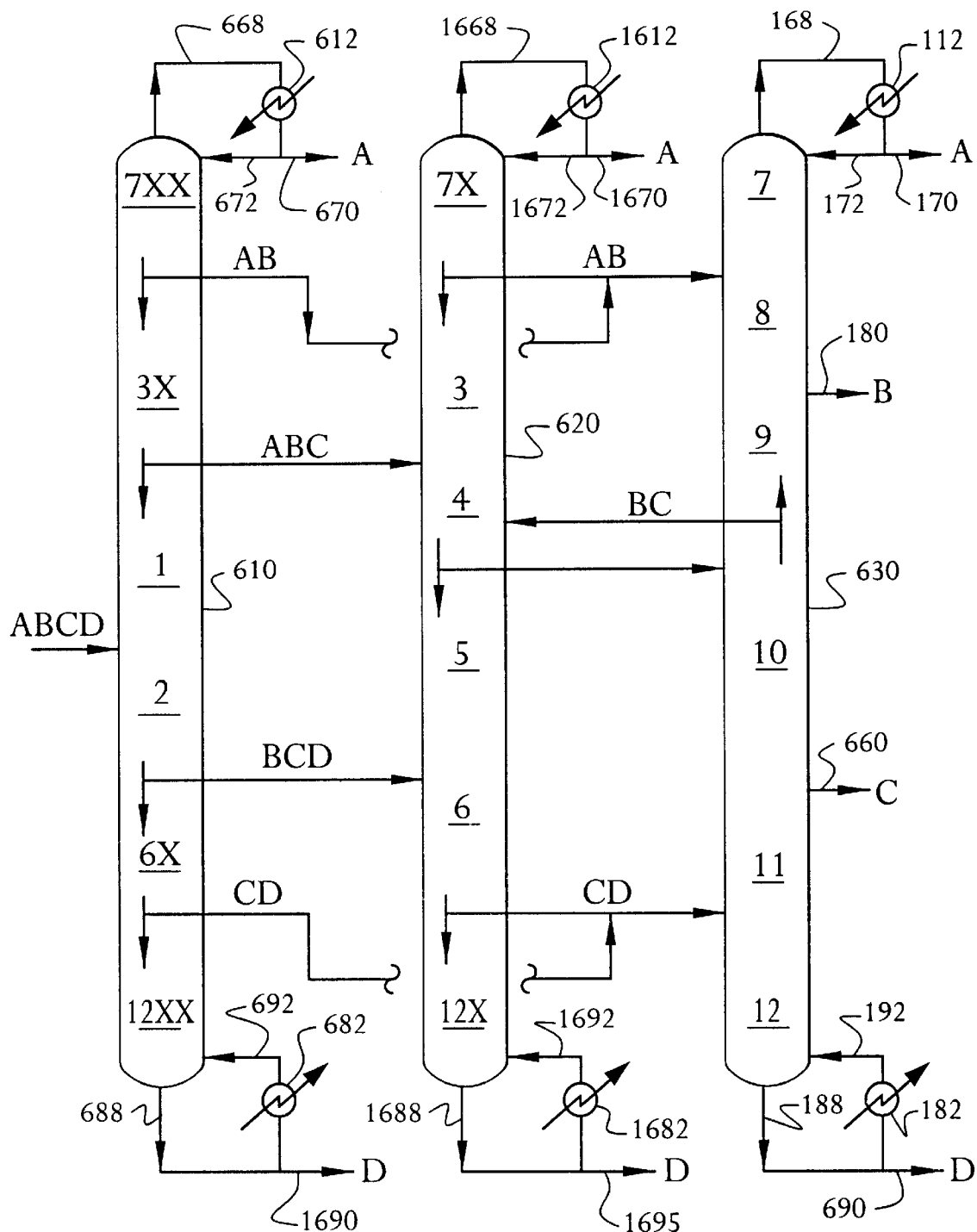
FIG. 16 is a schematic diagram of a ninth embodiment of the present invention.

The process in FIG. 16 is derived from the prior art process of FIG. 6. The two-way communications with mixtures containing the most volatile major constituent A but lean in the least volatile major constituent C are modified according to step (i) of the invention. Thus, distillation section 7x is added on top of distillation section 3 of distillation column 620. Similarly, distillation sections 3x and 7xx are added on top of distillation column 610. Note that now in addition to a primarily ternary mixture ABC, a primarily binary mixture AB also is withdrawn between distillation sections 3x and 7xx and transferred to the distillation column 630. The two-way communications with mixtures containing the least volatile major constituent D but lean in the most volatile major constituent A are modified according to step (ii) of the invention. This is accomplished by adding distillation section 12x below distillation section 6 of distillation column 620 and by adding distillation sections 6x and 12xx below distillation section 2 of distillation column 610. In this figure, the flow of binary vapor mixture BC containing primarily the components of intermediate volatility is shown from the distillation column 630 to distillation column 620. However, if needed, the direction of flow of this vapor stream can be reversed easily. This is possible because both of the distillation columns have their own reboilers and condensers and there relative pressures can be adjusted easily. The same is true for the transfer direction of binary liquid stream BC between the two distillation columns 620 and 630. Note that in FIG. 16, all of the three distillation columns produce a fraction of product stream enriched in the most volatile major constituent component A from the top and a fraction of product stream enriched in the least volatile major constituent component D from the bottom.

Figure 17:
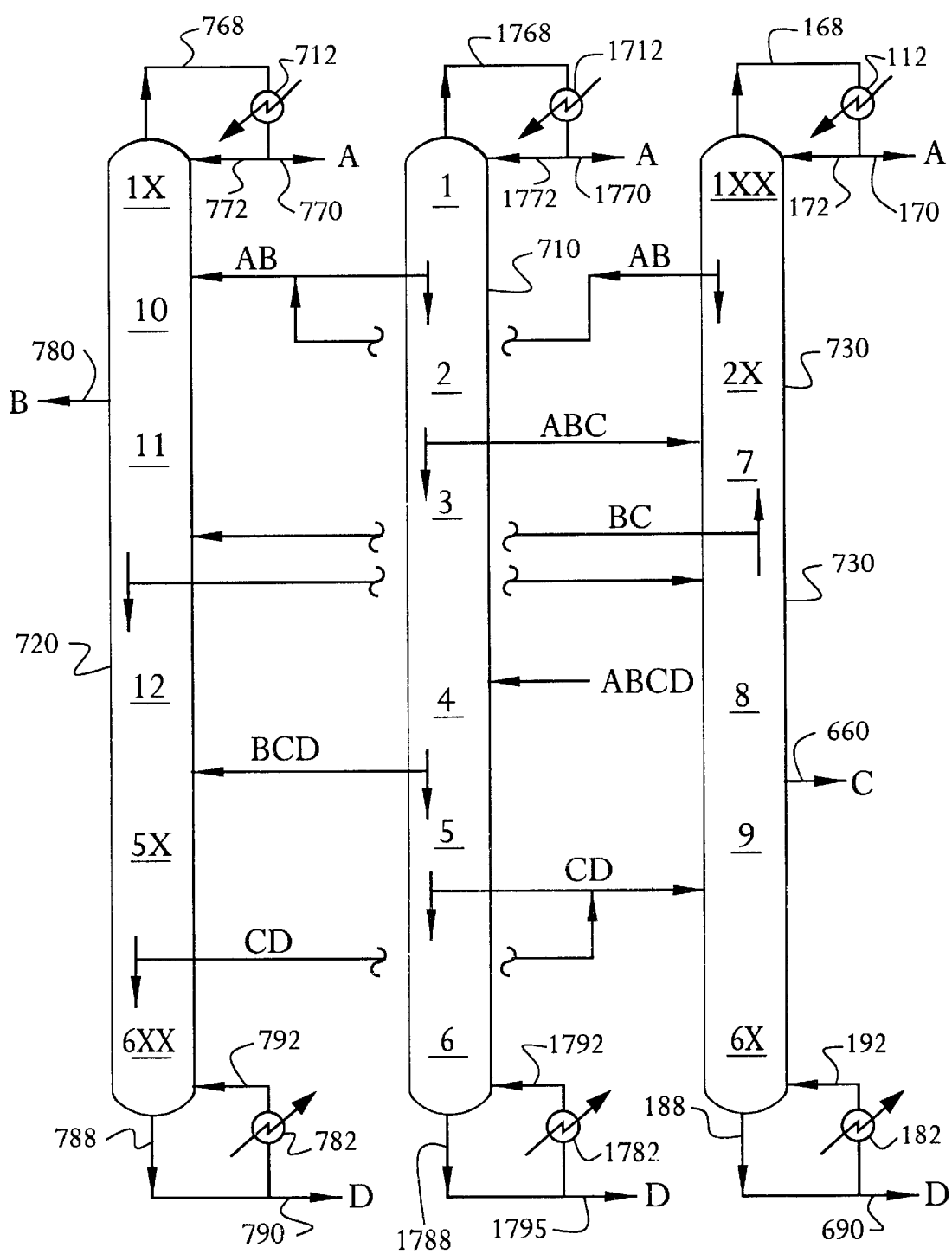
FIG. 17 is a schematic diagram of a tenth embodiment of the present invention.

The process in FIG. 17 is derived by applying the current invention to the prior art process of FIG. 7. These modifications are similar to the ones described for the development of FIG. 16 from the prior art process of FIG. 6. Distillation sections 2x, 1xx and 6x are added to distillation column 730 and distillation sections 1x, 5x and 6xx are added to distillation column 720. Once again, if needed, the flow direction of each of the binary mixture streams BC between the distillation columns 720 and 730 can be reversed. As a matter of fact, for certain cases this two-way communication involving BC may be totally eliminated.

Both the processes in FIGS. 16 and 17 involve a two-way communication containing a binary mixture BC that is lean in both the most volatile and the least volatile major constituents A and D. Therefore, this two-way communication can be modified according to step (iii) of the invention by adding a fourth distillation column. This new distillation column will receive feed BC as a one-way communication from one of the two distillation columns involved in the original two-way communication. Generally, this feed BC will come from the same distillation column from which liquid stream BC was withdrawn in the original two-way communication. The distillation sections below the feed BC of the new distillation column will perform a similar distillation task as the lower distillation sections of the distillation column receiving liquid stream BC in the original two-way communication. Similarly, the distillation sections above the feed BC of the new distillation column will perform a similar distillation task as the upper distillation sections of the distillation column receiving vapor stream BC in the original two-way communication. A portion of the product stream enriched in the most volatile major constituent A is recovered from the top of this new distillation column and a portion of the product stream enriched in the least volatile major constituent D is recovered from the bottom of this new distillation column.

It is interesting to note that additional possibilities exist when the feed mixture contains more than three components and the method of the current invention is used. For example, in FIG. 16, distillation section 7xx may not be used and instead a portion of the essentially binary mixture vapor stream AB from the top would be condensed in a condenser and sent as reflux to distillation section 3x while the other portion would be sent to distillation column 630 as shown. A portion of this essentially binary mixture stream AB may or may not be recovered as a product stream. The essentially binary mixture stream AB from the top of distillation section 3x is more enriched in component A than the mixture stream ABC at the top of distillation section 1

Figure 18:
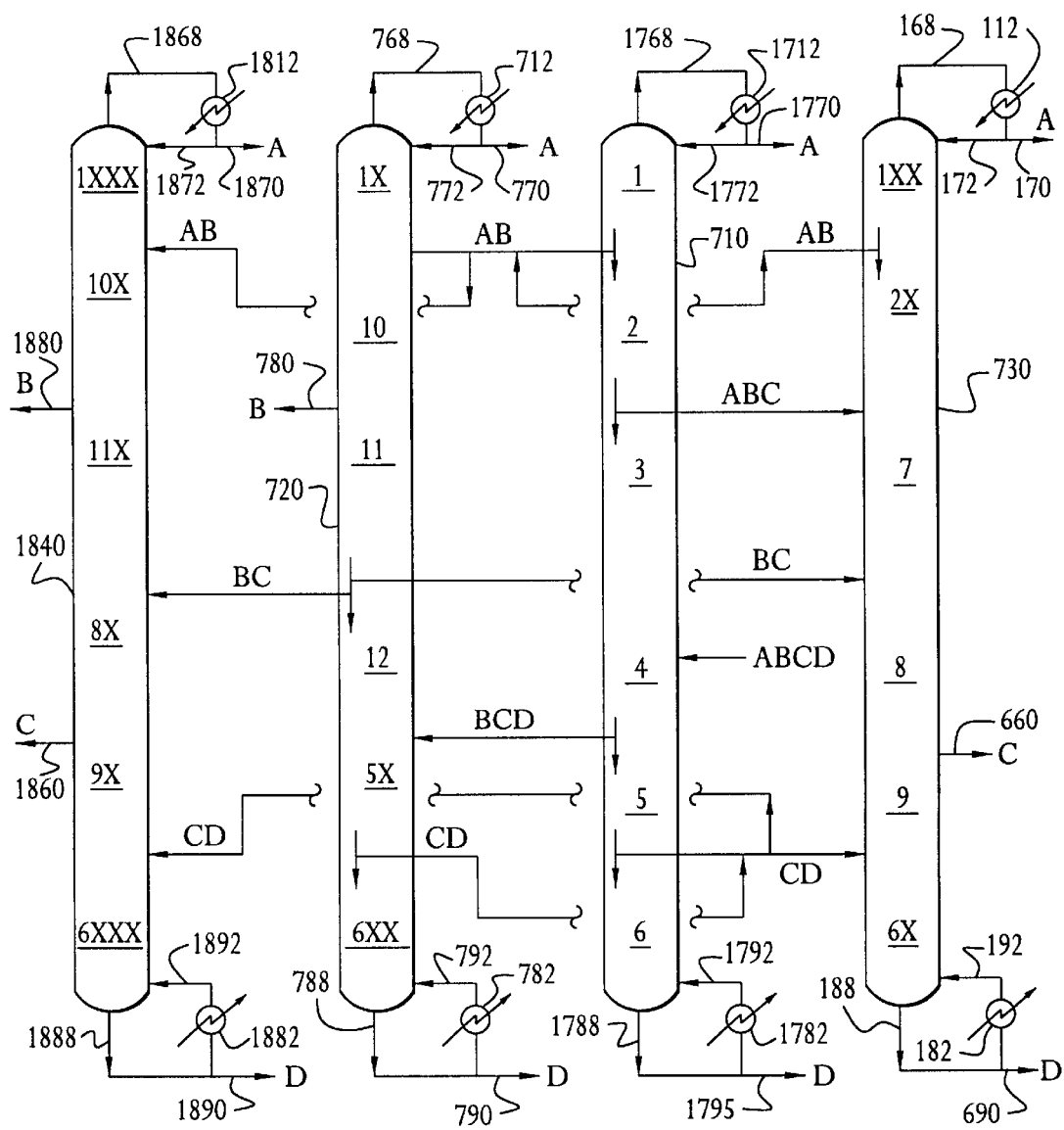
FIG. 18 is a schematic diagram of an eleventh embodiment of the present invention.

A modification of the process in FIG. 17 according to step (iii) of the invention is shown in FIG. 18. A fourth distillation column 1840 is added to the process. In the process of FIG. 17, liquid stream BC is transferred from distillation column 720 to distillation column 730. Therefore, a liquid stream BC is drawn from distillation column 720 and fed to the new distillation column 1840. The distillation sections 8x, 9x, and 6xxx below the liquid feed BC to distillation column 1840 perform distillation tasks similar to the distillation sections 8, 9 and 6x of the distillation column 730 receiving liquid stream BC in the original two-way communication. Similarly, distillation sections 11x, 10x and 1xxx of the new distillation column 1840 perform distillation tasks similar to distillation sections 11, 10 and 1x of the distillation column 720 receiving vapor stream BC in the original two-way communication. The process in FIG. 18 produces four product streams for each of the most volatile and the least volatile major constituents A and D. Furthermore, two product streams are produced for each of the major constituents B and C of the intermediate volatility.

In all the processes of FIGS. 8 through 18, multiple condensers are shown for the vapor streams enriched in the most volatile major constituent A. It is possible that at least some of these condensers may not be used and liquid reflux streams for the corresponding distillation columns may be obtained from another source in a plant where the process of the current invention is utilized. It also is possible to combine either two or more of the vapor streams each enriched in the most volatile major constituent A from two or more distillation columns. This combined stream is then condensed in one condenser. A portion of the condensed stream is then fed to the top of the distillation columns needing this liquid reflux.

Figure 19:
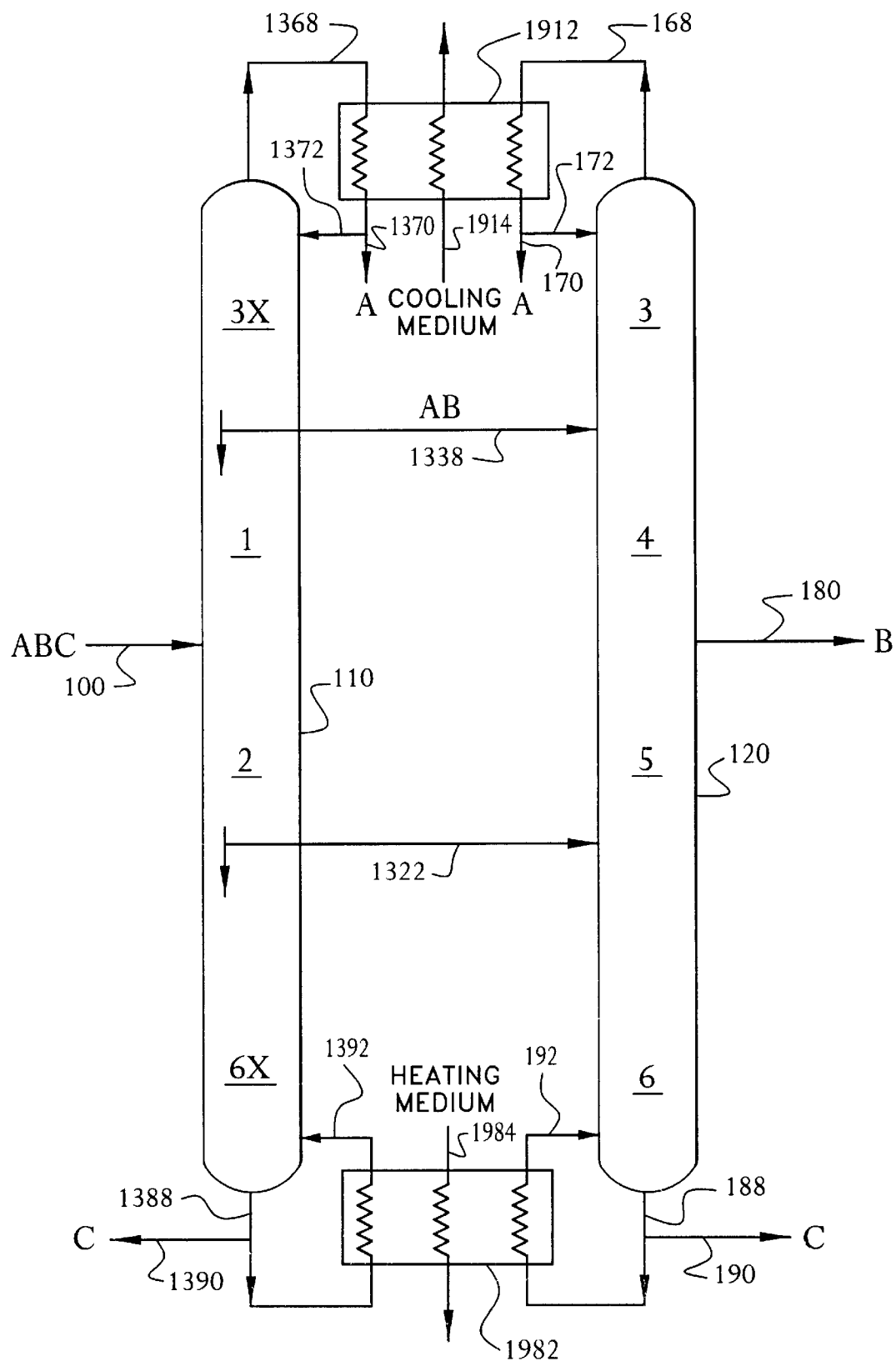
FIG. 19 is a schematic diagram of a twelfth embodiment of the present invention.

In yet another possibility, the vapor streams each enriched in the most volatile major constituent A may not be mixed but condensed in separate passages of a multi-passage heat exchanger. Such an example is shown in FIG. 19. The process in this figure is identical to the one shown in FIG. 13 with the difference that the A-enriched vapor streams (168, 1368) from each of the distillation columns 110 and 120 are condensed in one heat exchanger (condenser) 1912 but in different passages. Only one cooling medium 1914 is shown in this condenser 1912. However, if needed, more than one cooling medium may be used in different passages of this condenser. The same is true when more than one condenser is used, i.e., different cooling mediums may be used in different condensers.

In all the processes of FIGS. 8 through 18, multiple reboilers are shown for the liquid streams enriched in the least volatile major constituent. It is possible that at least some of these reboilers may not be used and vapor boilups for the corresponding distillation columns may be obtained from another source in a plant where the process of the current invention is utilized. It also is possible to combine either two or more of the liquid streams each enriched in the least volatile major constituent from two or more distillation columns. This combined stream is then boiled in one reboiler. A portion of the boiled stream is then fed to the bottom of the distillation columns needing this vapor boilup. In yet another possibility, the liquid streams each enriched in the least volatile major constituent may not be mixed but boiled in separate passages of a multi-passage heat exchanger. FIG. 19 shows one such reboiler 1982 in place of two reboilers in FIG. 13. Once again, only one or multiple heating mediums 1984 may be used to provide all of the required boilup duties.

When a two-way communication is converted to a one-way communication, the transfer of the liquid stream between the distillation columns can be controlled by using appropriate valves in the liquid transfer lines. This transfer may be aided by using liquid pumps or using gravitational head. Also, if needed, the liquid withdrawn from one distillation column may be first sent to a storage vessel and then from the storage vessel to another distillation column. The accumulated liquid volume in the storage vessel can dampen out any fluctuations and may make it easier to control the operation of the distillation columns.

One characteristic of the present invention is that there is more than one distillation column producing product streams enriched in the most volatile major constituent A. Since the purity of each of these product streams may or may not be the same, the ratio of liquid to vapor flow in the top most section of such distillation columns may or may not be the same. The same would be true for the bottom section of the distillation columns producing product streams enriched in the least volatile major constituent.

Figure 13:
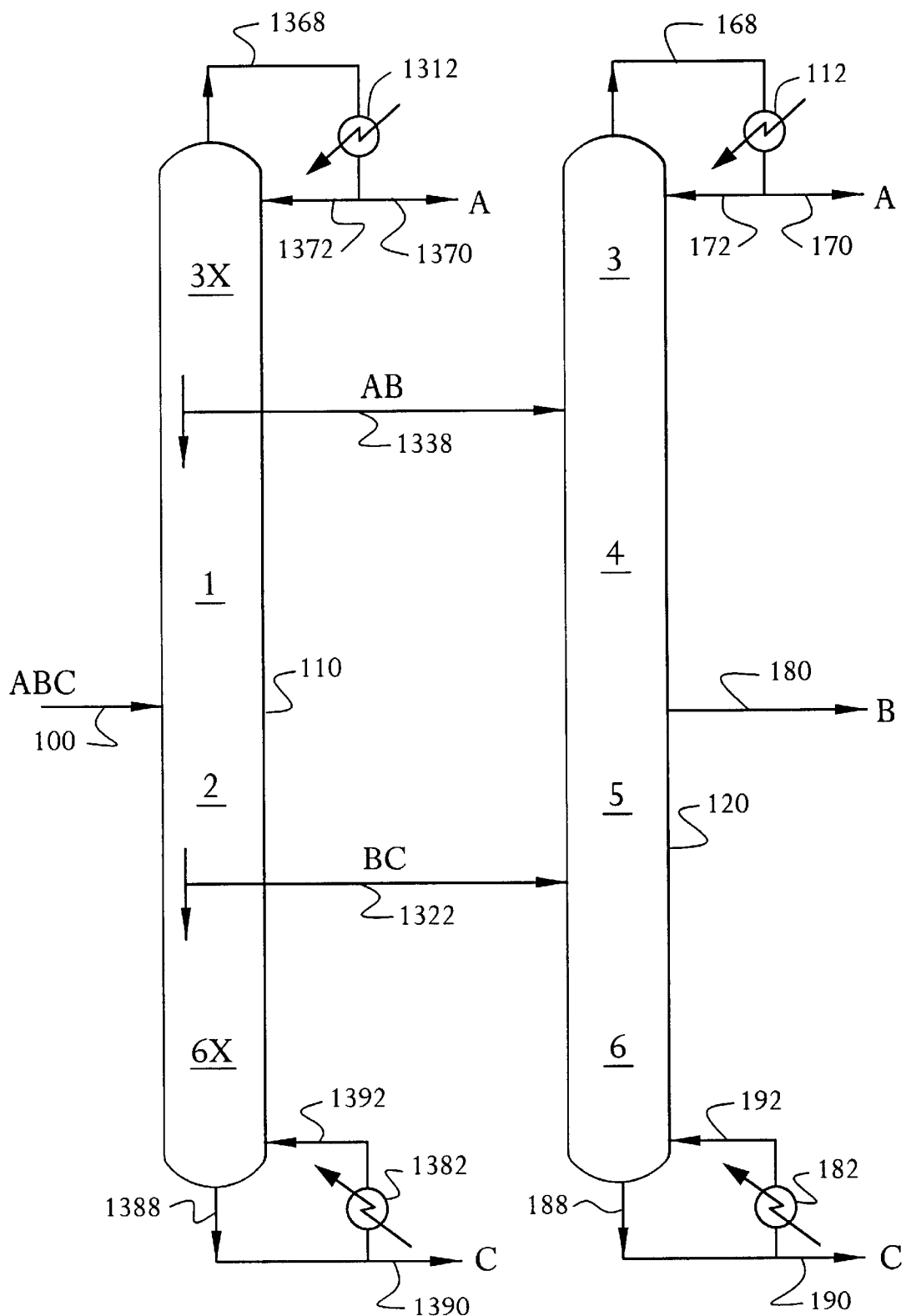
FIG. 13 is a schematic diagram of a sixth embodiment of the present invention.
Figure 14:
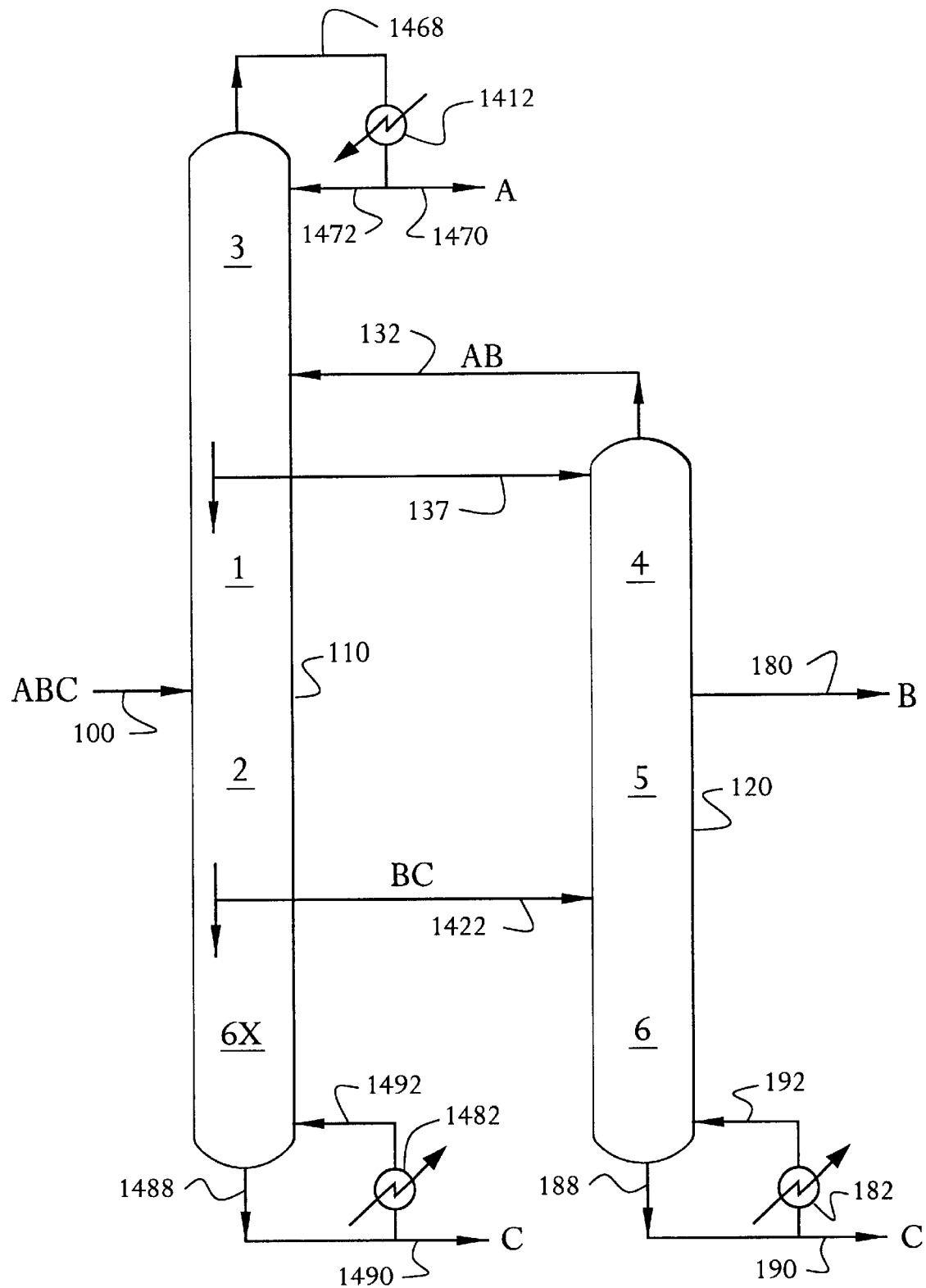
FIG. 14 is a schematic diagram of a seventh embodiment of the present invention.

It is possible to adjust the enthalpy of the liquid mixture stream between the transfer when a two-way communication is converted according to the current invention to a one-way communication. For example, in the process of FIG. 13, the enthalpy of liquid mixture BC in stream 1322 may be adjusted after it is withdrawn from distillation column 110. Therefore, this stream could be heated in a heat exchanger to a two-phase stream or an all vapor stream and then fed to distillation column 120. In another alternative, stream 1322 could be split into two streams and the enthalpy of only one or both the streams is adjusted and both the streams are fed at appropriate locations of distillation column 120. Thus, while a first portion of stream 1322 would be fed as shown in FIG. 13, the second portion could be heated to a two-phase or an all vapor stream and fed to a location that is a couple of stages below the feed location of the first portion. It also is possible to heat both the first and second portions to different degrees such that their specific enthalpies are not the same and then feed them at different locations of distillation column 120. While these examples are given with enthalpy adjustment by heating, it does not preclude enthalpy adjustment by subcooling either a portion or all of the liquid mixture BC in stream 1322. Note that even when liquid mixture BC is split into two streams and after enthalpy adjustment the streams are fed to two different locations of distillation column 120, such a transfer is a one-way communication as no return stream is sent from distillation column 120 to distillation column 110. Enthalpy adjustments also can be done for the liquid mixture AB in line 1338 of FIG. 13.

Once a process is drawn according to the present invention, additional reboilers and condensers can be used easily to further improve the process efficiency. For example, in any of the ternary processes of FIGS. 9 through 13, a reboiler or a condenser or both may be used on a B-enriched stream in distillation column 120. This also may allow a better control of the process.

It is self evident from the description of the present invention that the invention also may be applied to feed mixtures containing more than four constituent components. As the number of components in a feed mixture increases, the number of possible configurations that can be drawn using the current invention also increases.

In the flowsheets of FIGS. 1 through 19 some of the streams are designated alphabetical names. This shows the particular component in which that stream is enriched, and does not necessarily mean the absence of other components. Thus, a stream with letter A indicates a product stream enriched in component A, and it could be pure product stream or a stream contaminated with significant quantities of other components. Similarly, a stream with designation AB means that the stream is enriched in components A and B, and either it contains only components A and B or it contains smaller quantities of other heavier components, such as C.

The present invention is applicable to the separation by distillation of any suitable feed mixture containing three or more components. Some examples of feed streams for which the present invention is applicable include nitrogen/oxygen/argon mixtures, benzene/toluene/xylene mixtures, nitrogen/carbon monoxide/methane mixtures, any combination of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, isobutane-n-butane-gasoline, and any combination of three or more components from C1 to C6 hydrocarbons, or $C_4$ isomers.

Among the prior art processes for ternary distillation, it is well known that the thermally coupled distillation columns shown in FIGS. 1 through 5 require less vapor flow, and in particular, the fully thermally coupled process of FIG. 1 requires the least total vapor flow to perform the required distillation. Since the vapor flows are created through the reboilers, the required vapor flow is a direct measure of the heat duty needed for the distillation. A lower vapor flow is attractive as it leads to lower heat duty and smaller diameter of the distillation columns. The same would be true for fully thermally coupled distillation processes shown for a four-component feed mixture distillation in FIGS. 6 and 7.

However, most of these distillation processes rarely have been used in commercial applications. The primary reason is the operational challenges associated with the transfer of all the vapor streams between the distillation columns. This requires careful control of pressure profiles in each distillation column over the whole operating range. For fully thermally coupled distillation columns, the pressure relationship between the two distillation columns is such that while the transfer of the first vapor stream requires that the pressure at a location of the first distillation column be higher than the pressure at a location of the second distillation column, the transfer of the second vapor stream requires reverse pressure difference between another two locations of the columns. The distillation processes drawn according to the current invention either reduce or eliminate such constraints. The invention converts a two-way communication to a one-way communication whereby only a liquid mixture stream is withdrawn from one distillation column and eventually transferred to another distillation column. As a result, unlike the original two-way communication, no vapor stream is withdrawn from one distillation column for transfer to another distillation column. This allows much easier regulation of flow from one column to the other column. The important point to note is that such an ease of operation is obtained while retaining the lower vapor flow rates of the prior art distillation processes.

SEQUENCE LISTING

Not Applicable.

What is claimed is:

1. A process for distillation of a multicomponent fluid containing at least three components, each component having a different volatility, into at least three product streams, said process using at least two distillation columns, including a first distillation column and a second distillation column, wherein each distillation column has a top, a bottom, and at least two distillation sections between the top and the bottom, comprising the steps of:

feeding the multicomponent fluid into the first distillation column at a feed location between two of the at least two distillation sections of the first distillation column;

separating at least a portion of at least one component from the other components of the multicomponent fluid in the first distillation column, thereby forming at least one mixture stream lean in the at least one component;

transferring from the first distillation column to another distillation column at least one mixture stream chosen from (i) a mixture stream lean in a least volatile component in a one-way communication, wherein a distillation section adjacent the top of the first distillation column and a distillation section adjacent the top of the second distillation column each perform substantially similar tasks, or (ii) a mixture stream lean in a most volatile component in another one-way communication, wherein a distillation section adjacent the bottom of the first distillation column and a distillation section adjacent the bottom of the second distillation column each perform substantially similar tasks; and wherein at least one other communication occurs between any of the at least two distillation columns; and removing from the at least two distillation columns at least one stream chosen from a stream rich in the most volatile component at the top of the at least two distillation columns or a stream rich in the least volatile component at the bottom of the at least two distillation columns.

2. A process as in claim 1 wherein each stream removed at the top of the at least two distillation columns is a product stream.

3. A process as in claim 1 wherein each stream removed at the bottom of the at least two distillation columns is a product stream.

4. A process as in claim 1 wherein at least (i) the mixture stream lean in the least volatile component is a liquid stream, or (ii) the mixture stream lean in the most volatile component is a liquid stream.

5. A process as in claim 4 comprising the further steps of:

withdrawing at least one liquid stream from one of the at least two distillation columns; and feeding the at least one liquid stream to an intermediate location of another one of the at least two distillation columns.

6. A process as in claim 5 wherein the at least one other communication that occurs between any of the at least two distillation columns is a one-way communication whereby another mixture stream is transferred from one of the at least two distillation columns to another one of the at least two distillation columns.

7. A process as in claim 5, wherein the at least one other communication that occurs between any of the at least two distillation columns is a two-way communication, comprising the further steps of:

withdrawing a liquid mixture stream from a first location of one of the at least two distillation columns;

feeding the liquid mixture stream to a second location of another one of the at least two distillation columns;

withdrawing a vapor mixture stream simultaneously from the second location; and feeding the vapor mixture stream to the first location.

8. A process as in claim 1 wherein the multicomponent fluid is selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

9. A process for distillation of a multicomponent fluid containing at least three components, each component having a different volatility, into multiple product streams, wherein the process uses at least two distillation columns that are thermally coupled, and each distillation column has a top and a bottom, the first distillation column and the second distillation column having at least one two-way communication wherein a liquid mixture stream withdrawn from the first or second distillation column is fed to the other distillation column at a first location and a vapor mixture stream is simultaneously withdrawn from the first location and fed to the distillation column from which the liquid mixture stream is withdrawn, the liquid mixture stream is at least lean in the least volatile component or the most volatile component, there being at least one other communication between any two of the at least two distillation columns when the liquid mixture is lean in the most volatile component, the improvement comprising the steps of:

converting at least one two-way communication between the first distillation column and the second distillation column to a one-way communication between the first distillation column and the second distillation column; and removing from the first and second distillation columns at least three product streams, each product stream enriched in one of the components.

10. A process as in claim 9, wherein the at least one two-way communication involves a mixture containing a most volatile component and being lean in a least volatile component, the improvement comprising the further steps of:

adding a distillation section between the top of the first or second distillation column and a distillation section adjacent the top of said first or second distillation column, whereby a vapor withdrawn from the top of said first or second distillation column is enriched in the most volatile component; and establishing a one-way communication between the first and second distillation columns, wherein a liquid mixture stream is withdrawn from an intermediate location of the first or second distillation column and is fed to the other distillation column, said liquid mixture stream containing components identical to the components in the at least one two-way communication converted to the one-way communication.

11. A process as in claim 10 wherein the liquid mixture is withdrawn from said distillation column having the additional distillation section.

12. A process as in claim 10 wherein the liquid mixture is withdrawn from the distillation column which does not have the additional distillation section.

13. A process according to claim 10 wherein the step of removing from the first and second distillation columns at least four product streams, each stream enriched in one of the components, comprises the following sub-steps:

removing a first product stream rich in the most volatile component from the top of the first distillation column;

removing a second product stream rich in the least volatile component from the bottom of the first distillation column;

removing a third product stream from the bottom of the second distillation column, the third product stream being rich in a component having an intermediate volatility, said intermediate volatility being between the volatility of the most volatile component and the volatility of the least volatile component; and removing a fourth product stream enriched in the most volatile component from the top of the second distillation column.

14. A process as in claim 10 wherein the step of removing from the first and second distillation columns at least four product streams, each stream enriched in one of the components, comprising the following sub-steps:
- removing a first product stream rich in the most volatile component from the top of the second distillation column;
- removing a second product stream rich in the least volatile component from the bottom of the second distillation column;
- removing a third product stream rich in a component having an intermediate volatility from an intermediate location of the second distillation column, said intermediate volatility being between the volatility of the most volatile component and the volatility of the least volatile component; and
- removing a fourth product stream enriched in the most volatile component from the top of the first distillation column.

15. A process as in claim 10 wherein the step of removing from the first and second distillation columns at least four product streams, each stream enriched in one of the components, comprises the following sub-steps:
- removing a first product stream rich in the most volatile component from the top of the first distillation column;
- removing a second product stream rich in the least volatile component from the bottom of the first distillation column;
- removing a third product stream enriched in the most volatile component from the top of the second distillation column; and
- removing a fourth product stream rich in a component having an intermediate volatility from an intermediate location of the second distillation column, the intermediate volatility being between the volatility of the most volatile component and the volatility of the least volatile component.

16. A process as in claim 10 wherein the step of removing from the first and second distillation columns at least five product streams, each stream enriched in one of the components, comprises the following sub-steps:
- removing a first product stream rich in the most volatile component from the top of the first distillation column;
- removing a second product stream rich in the least volatile component from the bottom of the first distillation column;
- removing a third product stream enriched in the most volatile component from the top of the second distillation column;
- removing a fourth product stream enriched in the least volatile component from the bottom of the second distillation column; and
- removing a fifth product stream rich in a component having an intermediate volatility from an intermediate location of the second distillation column, said intermediate volatility being between the volatility of the most volatile component and the volatility of the least volatile component.

17. A process as in claim 9, wherein the at least one two-way communication involves a mixture containing a least volatile component and being lean in a most volatile component, the improvement comprising the further step of:
- adding a distillation section between the bottom of the first or second distillation column and a distillation section adjacent the bottom of said first or second distillation column, whereby a liquid withdrawn from the bottom of said first or second distillation column is enriched in the least volatile component; and
- establishing a one-way communication between the first and second distillation columns, wherein a liquid mixture stream is withdrawn from an intermediate location of the first or second distillation column and is fed to the other distallation column, said liquid mixture stream containing components identical to the components in the at least one two-way communication converted to the one-way communication.

18. A process as in claim 17 wherein the step of removing from the first and second distillation columns at least four product streams, each stream enriched in one of the components, comprises the following sub-steps:
- removing a first product stream rich in the most volatile component from the top of the second distillation column;
- removing a second product stream rich in the least volatile component from the bottom of the second distillation column;
- removing a third product stream rich in a component having an intermediate volatility from an intermediate location of the second distillation column, said intermediate volatility being between the volatility of the most volatile component and the volatility of the least volatile component; and
- removing a fourth product stream enriched in the least volatile component from the bottom of the first distillation column.

19. A process as in claim 17 wherein the step of removing from the first and second distillation columns at least four product streams, each stream enriched in one of the components, comprises the following sub-steps:
- removing a first product stream rich in the most volatile component from the top of the first distillation column;
- removing a second product stream rich in the least volatile component from the bottom of the first distillation column;
- removing a third product stream enriched in the least volatile component from the bottom of the second distillation column; and
- removing a fourth product stream rich in a component having an intermediate volatility from an intermediate location of the second distillation column, said intermediate volatility being between the volatility of the most volatile component and the volatility of the least volatile component.

20. A process as in claim 17 wherein the step of removing from the first and second distillation columns at least five product streams, each stream enriched in one of the components, comprises the following sub-steps:
- removing a first product stream rich in the most volatile component from the top of the first distillation column;
- removing a second product stream rich in the least volatile component from the bottom of the first distillation column;
- removing a third product stream enriched in the most volatile component from the top of the second distillation column;
- removing a fourth product stream enriched in the least volatile component from the bottom of the second distillation column; and
- removing a fifth product stream rich in a component having an intermediate volatility from an intermediate location of the second distillation column, said intermediate volatility being between the volatility of the most volatile component and the volatility of the least volatile component.

21. A process as in claim 9, wherein the at least one two-way communication involves a mixture being lean in a most volatile component and lean in a least volatile component, the improvement comprising the further steps of:
   providing another distillation column having a top and bottom whereby a vapor withdrawn from the top of said distillation column is enriched in the most volatile component and a liquid withdrawn from the bottom of said distillation column is enriched in the least volatile component;
   withdrawing a liquid mixture from the first or second distillation column, said liquid mixture containing components identical to the components in the at least one two-way communication; and
   feeding said liquid mixture to the another distillation column.

22. A process as in claim 17 wherein the liquid mixture is withdrawn from said distillation column having the additional distillation section.

23. A process as in claim 17 wherein the liquid mixture is withdrawn from the distillation column which does not have the additional distillation section.

24. A process as in claim 9, the improvement comprising the further steps of:
   heat exchanging the withdrawn liquid mixture; and
   feeding the heat exchanged liquid mixture to another distillation column.

25. A process as in claim 9, the improvement comprising the further steps of:
   transferring the withdrawn liquid mixture to a storage tank;
   withdrawing the liquid mixture from the storage tank; and
   feeding the liquid mixture withdrawn from the storage tank to another distillation column.

26. A process as in claim 9, the improvement comprising the further step of condensing a plurality of vapor streams enriched in a most volatile component in at least two condensers.

27. A process as in claim 26, wherein the at least two condensers are combined in one heat exchanger.

28. A process as in claim 9, the improvement comprising the further step of boiling a plurality of liquid streams enriched in a least volatile component in at least two reboilers.

29. A process as in claim 28 wherein the at least two reboilers are combined in one heat exchanger.

30. A process as in claim 9 wherein the multicomponent fluid is selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentanehexane, butane-isopentane-pentane, iso-butane-n-butane-gasoline, and combinations of three or more components from C1 to C6 hydrocarbons or $C_4$ isomers.

31. An apparatus for distillation of a multicomponent fluid containing at least three components of different volatilities, said apparatus comprising:
   a distillation column system comprising at least two distillation columns;
   conduit means for feeding the multicomponent fluid into one of said columns;
   conduit means for removing from a column of the distillation system a product stream rich in the most volatile component;
   conduit means for transferring from said one column to another column of the distillation system in a one-way communication a mixture stream lean in the least volatile component;
   conduit means for removing from a column of the distillation system other than said one column a product stream rich in the most volatile component;
   conduit means for removing from the distillation column system at least one product stream rich in the least volatile component; and
   conduit means for removing from the distillation column system at least one product stream rich in a component of intermediate volatility.

32. An apparatus for distillation of a multicomponent fluid containing at least three components of different volatilities, said apparatus comprising:
   a distillation column system comprising a first distillation column having at least two distillation sections and a second distillation column having at least two distillation;
   conduit means for feeding the multicomponent fluid into the first column at a feed location between said two distillation sections thereof;
   conduit means for removing from the first column a product stream rich in the most volatile component;
   conduit means for transferring from the first column to the second column in a one-way communication a mixture stream lean in the least volatile component;
   conduit means for removing from the second column a product stream rich in the most volatile component;
   conduit means for removing from the distillation column system at least one product stream rich in the least volatile component; and
   conduit means for removing from the distillation column system at least one product stream rich in a component of intermediate volatility.

33. An apparatus for distillation of a multicomponent fluid containing at least three components of different volatilities, said apparatus comprising:
   a distillation column system comprising at least two distillation columns;
   conduit means for feeding the multicomponent fluid into one of said columns;
   conduit means for removing from a column of the distillation system a product stream rich in the least volatile component;
   conduit means for transferring from said one column to another column of the distillation system in a one-way communication a mixture stream lean in the most volatile component;
   conduit means for removing from a column of the distillation system other than said one column a product stream rich in the least volatile component;
   conduit means for removing from the distillation column system at least one product stream rich in the most volatile component;
   conduit means for removing from the distillation column system at least one product stream rich in a component of intermediate volatility, and conduit means for transferring an additional mixture stream between the columns providing said product streams rich in the least volatile component.

34. An apparatus for distillation of a multicomponent fluid containing at least three components of different volatilities, said apparatus comprising:

a distillation column system comprising a first distillation column and a second distillation column having at least two distillation sections;

conduit means for feeding the multicomponent fluid into the first column at a feed location between said two distillation sections thereof;

conduit means for removing from the first column a product stream rich in the least volatile component;

conduit means for transferring from the first column to the second column in a one-way communication a mixture stream lean in the most volatile component;

conduit means for removing from the second column a product stream rich in the least volatile component;

conduit means for removing from the distillation column system at least one product stream rich in the most volatile component;

conduit means for removing from the distillation column system at least one product stream rich in a component of intermediate volatility; and conduit means for transferring an additional mixture stream between the first and second columns.

35. An apparatus as claimed in claim 34, wherein the conduit mean for transferring an additional mixture stream connects the first and second columns to transfer a mixture stream containing the most volatile component and lean in the least volatile component from an intermediate location of the first column above the multicomponent feed to an intermediate location of the second column; and the conduit means for removing from the distillation column system at least one product stream rich in the most volatile component withdraws such product streams from the tops of the first and second columns.

* * * * *